(12) United States Patent
Wang

(10) Patent No.: US 12,267,877 B2
(45) Date of Patent: Apr. 1, 2025

(54) RANDOM ACCESS TO A WIRELESS COMMUNICATION NETWORK

(71) Applicant: Telefonaktiebolaget LM Ericsson (publ), Stockholm (SE)

(72) Inventor: Min Wang, Luleå (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 538 days.

(21) Appl. No.: 17/638,346

(22) PCT Filed: Aug. 24, 2020

(86) PCT No.: PCT/EP2020/073662
§ 371 (c)(1),
(2) Date: Feb. 25, 2022

(87) PCT Pub. No.: WO2021/037813
PCT Pub. Date: Mar. 4, 2021

(65) Prior Publication Data
US 2022/0304076 A1  Sep. 22, 2022

Related U.S. Application Data

(60) Provisional application No. 62/892,304, filed on Aug. 27, 2019.

(51) Int. Cl.
*H04W 74/0833* (2024.01)
*H04W 72/02* (2009.01)
(Continued)

(52) U.S. Cl.
CPC ....... *H04W 74/0841* (2013.01); *H04W 72/02* (2013.01); *H04W 72/0446* (2013.01);
(Continued)

(58) Field of Classification Search
CPC ............. H04W 74/0841; H04W 72/02; H04W 72/0446; H04W 72/56; H04W 74/004; H04W 74/0866; H04W 74/0833
See application file for complete search history.

(56) References Cited

U.S. PATENT DOCUMENTS 11,064,521 B2 * 7/2021 Bhorkar ............ H04W 74/0808
11,864,229 B2 * 1/2024 Talarico ................ H04L 1/1854
(Continued)

OTHER PUBLICATIONS

3GPP TSG-RAN WG1 Meeting398, R1-1909241 Title: Other Considerations for Two-step RACH (Year: 2017).*
(Continued)

*Primary Examiner* — Christopher M Crutchfield
*Assistant Examiner* — Abusayeed M Haque
(74) *Attorney, Agent, or Firm* — Weisberg I.P. Law, P.A.

(57) ABSTRACT

A wireless device selects an occasion or resource unit to use for transmitting a payload within a slot that is the same as or immediately after a slot in which the wireless device transmits a random access preamble for random access to a wireless communication network. The occasion or resource unit is selected based on one or more selection criteria. The one or more selection criteria may include a type, purpose, and/or priority of the random access, of an event that triggered the random access, or of the payload. Alternatively or additionally, the one or more selection criteria may include a capability of the wireless device to transmit both the random access preamble and the payload based on the same clear channel assessment. Regardless, the wireless device transmits the payload using the selected occasion or resource unit.

18 Claims, 22 Drawing Sheets

(51) Int. Cl.
  *H04W 72/0446* (2023.01)
  *H04W 72/56* (2023.01)
  *H04W 74/00* (2009.01)
  *H04W 74/08* (2009.01)
  *H04W 74/0808* (2024.01)

(52) U.S. Cl.
  CPC ......... *H04W 72/56* (2023.01); *H04W 74/004* (2013.01); *H04W 74/0866* (2013.01)

(56) References Cited

U.S. PATENT DOCUMENTS

| | | | |
|---|---|---|---|
| 2019/0174449 A1* | 6/2019 | Shan | H04W 60/04 |
| 2019/0230706 A1* | 7/2019 | Li | H04B 7/0695 |
| 2019/0268971 A1* | 8/2019 | Talarico | H04W 76/27 |
| 2019/0281587 A1* | 9/2019 | Zhang | H04W 72/23 |
| 2019/0281588 A1* | 9/2019 | Zhang | H04B 7/0617 |
| 2019/0323383 A1* | 10/2019 | Ingley | F02K 3/06 |
| 2021/0195639 A1* | 6/2021 | Kim | H04W 16/14 |

OTHER PUBLICATIONS

International Search Report and Written Opinion dated Oct. 14, 2020 for International Application No. PCT/EP2020/073662 filed Aug. 24, 2020, consisting of 12-pages.

3GPP TS 38.321 V16.0.0; 3rd Generation Partnership Project: Technical Specification Group Radio Access Network: NR; Medium Access Control (MAC) protocol specification (Release 16); Mar. 2020, consisting of 141-pages.

3GPP TR 38.889 V16.0.0; 3rd Generation Partnership Project: Technical Specification Group Radio Access Network: Study on NR-based access to unlicensed spectrum (Release 16); Dec. 2018, consisting of 119-pages.

3GPP TSG RAN WG1 #98 R1-1908134; Title: Discussion on channel structure for 2-step RACH; Agenda Item: 7.2.1.1; Source: Vivo; Document for: Discussion and Decision; Date and Location: Aug. 26-30, 2019, Prague, CZ, consisting of 16-pages.

3GPP TSG RAN WG1 Meeting #98 R1-1908762; Title: Channel Structure for Two-Step RACH; Agenda Item: 7.2.1.1; Source: Sony; Document for: Discussion and Decision; Date and Location: Aug. 26-30, 2019, Prague, CZ, consisting of 7-pages.

3GPP TSG-RAN WG1 Meeting #98 R1-1909241; Title: Other Considerations for Two-Step RACH; Agenda Item: 7.2.1.3; Source: Qualcomm Incorporated; Document for: Discussion and Decision; Date and Location: Aug. 26-30, 2019, Prague, Czech Republic, consisting of 5-pages.

3GPP TSG RAN Meeting #82 RP-182878 (revision of RP-182806); Title: New WID on NR-based Access to Unlicensed Spectrum; Agenda Item: 9.1.1; Source: Qualcomm Incorporated; Document for: Approval; Date and Location: Dec. 10-13, 2018, Sorrento, Italy, consisting of 8-pages.

* cited by examiner

PERFORMING A FIRST CLEAR CHANNEL ASSESSMENT FOR A FIRST OCCASION OR RESOURCE UNIT, TO ASSESS WHETHER UNLICENSED FREQUENCY SPECTRUM IS CLEAR FOR THE WIRELESS DEVICE TO TRANSMIT A PAYLOAD USING THE FIRST OCCASION OR RESOURCE UNIT WITHIN A SLOT THAT IS THE SAME AS OR IMMEDIATELY AFTER A SLOT IN WHICH THE WIRELESS DEVICE TRANSMITS A RANDOM ACCESS PREAMBLE FOR RANDOM ACCESS TO A WIRELESS COMMUNICATION NETWORK
600

RESPONSIVE TO THE FIRST CLEAR CHANNEL ASSESSMENT INDICATING THE UNLICENSED FREQUENCY SPECTRUM IS NOT CLEAR FOR THE WIRELESS DEVICE TO TRANSMIT THE PAYLOAD USING THE FIRST OCCASION OR RESOURCE UNIT, SELECTING A SECOND OCCASION OR RESOURCE UNIT THAT IS LOCATED IN A DIFFERENT PART OF THE UNLICENSED FREQUENCY SPECTRUM
610

PERFORMING A SECOND CLEAR CHANNEL ASSESSMENT FOR THE SECOND OCCASION OR RESOURCE UNIT, E.G., TO ASSESS WHETHER THE UNLICENSED FREQUENCY SPECTRUM IS CLEAR FOR THE WIRELESS DEVICE TO TRANSMIT A PAYLOAD USING THE SECOND OCCASION OR RESOURCE UNIT WITHIN A SLOT THAT IS THE SAME AS OR IMMEDIATELY AFTER A SLOT IN WHICH THE WIRELESS DEVICE TRANSMITS A RANDOM ACCESS PREAMBLE FOR RANDOM ACCESS TO A WIRELESS COMMUNICATION NETWORK
620

FIGURE 6

RANDOM ACCESS TO A WIRELESS COMMUNICATION NETWORK

CROSS-REFERENCE TO RELATED APPLICATIONS

This application is a Submission Under 35 U.S.C. § 371 for U.S. National Stage Patent Application of International Application No.: PCT/EP2020/073662, filed Aug. 24, 2020 entitled "RANDOM ACCESS TO A WIRELESS COMMUNICATION NETWORK," which claims priority to U. S. Provisional Application No.: 62/892304, filed Aug. 27, 2019, entitled "RANDOM ACCESS TO A WIRELESS COMMUNICATION NETWORK," the entireties of both of which are incorporated herein by reference.

TECHNICAL FIELD

The present application relates generally to a wireless communication network and relates more specifically to random access to such a network.

BACKGROUND

A wireless device performs random access to a wireless communication network in order to acquire uplink synchronization and/or an uplink grant. Random access conventionally requires two rounds of transmission and response, for a total of four steps. In the first round of transmission and response, the wireless device transmits a random access preamble to the network over a random access channel (step 1), and the network responds with a random access response which includes a timing advance for uplink synchronization and an uplink grant for the wireless device (step 2). In the second round of transmission and response, the wireless devices transmits a payload (e.g., a connection establishment or resume request) using the uplink grant and timing advance (step 3), and the network responds with a message for early contention resolution (step 4).

A so-called two-step random access procedure condenses these four steps into two steps, by eliminating one round of transmission and response. In the two-step procedure, the wireless device transmits the random access preamble as well as the payload (step 1), e.g., using a default or stored timing advance. That is, the wireless device transmits the payload before receiving the random access response. The network then replies with both the random access response and a contention resolution message. The two-step random access procedure therefore proves advantageous for reducing the latency of random access.

However, performing the two-step random access procedure in unlicensed frequency spectrum jeopardizes the procedure's ability to reduce latency. Indeed, unsuccessful clear channel assessment in the unlicensed frequency spectrum threatens to delay the procedure's completion.

SUMMARY

Some embodiments herein facilitate performance of two-step random access to a wireless communication network, e.g., in which a wireless device transmits a random access preamble and a payload within the same slot or within successive slots. Some embodiments more particularly facilitate performance of such two-step random access in unlicensed frequency spectrum, e.g., in a way that reduces the latency of random access for at least some random access attempts such as high priority random access attempts. For example, some embodiments facilitate transmitting the payload within a certain amount of time (e.g., 16 us) after transmitting the random access preamble, at least for some random access attempts (e.g., high priority random access attempts). This way, the wireless device need only perform one clear channel assessment for both the preamble transmission and the payload transmission, rather than two clear channel assessments, one for the preamble transmission and one for the payload transmission.

According to some embodiments, for example, a wireless device selects an occasion or resource unit to use for transmitting the payload based on one or more selection criteria. The selection criteria may include for instance a type, purpose, and/or priority of the random access, of an event that triggered the random access, or of the payload. The selection criteria may alternatively or additionally include a gap in time between an end of a transmission of the random access preamble and a start of the occasion or resource unit. The selection criteria in other embodiments may alternatively or additionally include a capability of the wireless device to transmit both the random access preamble and the payload based on the same clear channel assessment. Where the selection criteria includes said priority, for example, the wireless device may select an occasion or resource unit that starts less than or equal to a first threshold amount of time (e.g., 16 us) or more than a second threshold amount of time (e.g., 16 us or 25 us) after the end of the transmission of the random access preamble, depending respectively on whether said priority is a first priority level or a second priority level. This way, if the occasion or resource unit starts less than or equal to the first threshold amount of time, the wireless device may transmit the payload based on the clear channel assessment already successfully performed for transmission of the preamble.

More particularly, embodiments herein include a method performed by a wireless device. The method comprises selecting an occasion or resource unit to use for transmitting a payload within a slot that is the same as or immediately after a slot in which the wireless device transmits a random access preamble for random access to a wireless communication network. The occasion or resource unit is selected based on one or more selection criteria. The one or more selection criteria may include a type, purpose, and/or priority of the random access, of an event that triggered the random access, or of the payload. Alternatively or additionally, the one or more selection criteria may include a capability of the wireless device to transmit both the random access preamble and the payload based on the same clear channel assessment. Regardless, the method may further comprise transmitting the payload using the selected occasion or resource unit.

In some embodiments, selecting the occasion or resource unit to use comprises selecting an occasion or resource unit that starts less than or equal to a first threshold amount of time or more than a second threshold amount of time after an end of the transmission of the random access preamble, depending respectively on whether said priority is a first priority level or a second priority level. In this case, the first priority level is higher than the second priority level, and the first threshold amount of time is the same as or different than the second threshold amount of time.

In some embodiments, the method further comprises performing either a single clear channel assessment to assess whether unlicensed frequency spectrum is clear for the wireless device to transmit both the random access preamble and the payload, or performing two clear channel assessments, one to assess whether the unlicensed frequency spectrum is clear for the wireless device to transmit the random access preamble and another to assess whether the unlicensed frequency spectrum is clear for the wireless device to transmit the payload, depending respectively on whether or not the selected occasion or resource unit starts less than or equal to the first threshold amount of time after the end of the transmission of the random access preamble.

In some embodiments, the method further comprises selecting a random access preamble or a random access channel occasion to use for the random access. In this case, selecting the occasion or resource unit to use for transmitting the payload may comprise determining, from among different sets of occasions or resources units that are respectively associated with different random access preambles or different random access channel occasions, the set of occasions or resource units which is associated with the selected random access preamble or random access channel occasion. The method may then comprise selecting the occasion or resource unit to use for transmitting the payload from among the occasions or resource units in the determined set, based on the one or more selection criteria. In one such embodiment, selecting the occasion or resource unit to use for transmitting the payload further comprises randomly selecting the occasion or resource unit to use from among multiple occasions or resource units in the determined set that meet the one or more selection criteria.

In some embodiments, the one or more selection criteria include said priority. Alternatively or additionally, the one or more selection criteria in some embodiments include said capability. Regardless, in some embodiments, the one or more selection criteria further include a gap in time, if any, between an end of a transmission of the random access preamble and a start of the occasion or resource unit.

In some embodiments, the random access is a two-step random access, where the random access preamble and the payload are included in a MsgA transmission, and where the payload is a payload of a Physical Uplink Shared Channel, PUSCH.

In some embodiments, the selected occasion or resource unit is a PUSCH occasion (PO) or a PUSCH resource unit (PRU), where a PUSCH resource unit is a combination of a PUSCH occasion and a Demodulation Reference Signal port or sequence.

In some embodiments, the method further comprises performing one or more clear channel assessments to assess whether unlicensed frequency spectrum is clear for the wireless device to transmit the random access preamble and the payload. In this case, transmitting may comprise transmitting the random access preamble and/or the payload using the selected occasion or resource unit, responsive to the one or more clear channel assessments indicating that the unlicensed frequency spectrum is clear for the wireless device to transmit the random access preamble and/or the payload.

In some embodiments, the random access is prioritized above one or more other random accesses if: the random access is triggered for a handover of the wireless device; or the random access is triggered for Radio Resource Control, RRC, re-establishment in order to recover from failure of a radio link or beam.

In some embodiments, the random access is prioritized above one or more other random accesses if the random access is triggered by failure of the wireless device to find a valid physical uplink control channel resource for transmitting a scheduling request according to a scheduling request configuration that is mapped to a logical channel with a priority level above a priority level threshold.

In some embodiments, selecting the occasion or resource unit to use comprises selecting the occasion or resource unit from among different occasions or resource units configured for different channels. In this case, the occasion or resource unit may be selected based on channel occupancy and/or clear channel assessment failure statistics for the different channels. In one such case, selecting the occasion or resource unit to use comprises favoring a occasion or resource unit configured for a first channel that has a lower channel occupancy or occurrence of clear channel assessment failures than a second channel for which another occasion or resource unit is configured. Alternatively or additionally, the different channels may be or may be associated with different subbands, bandwidth parts, or cells.

In some embodiments, the method further comprises receiving configuration signaling that configures one or more parameters at the wireless device for selecting the occasion or resource unit based on the one or more selection criteria.

In some embodiments, transmitting the payload comprises transmitting the payload in unlicensed frequency spectrum.

Embodiments herein also include a method performed by a network node. The method comprises transmitting configuration signaling to a wireless device. The configuration signaling configures one or more parameters at the wireless device for selecting an occasion or resource unit based on one or more selection criteria. The occasion or resource unit is an occasion or resource unit to use for transmitting a payload within a slot that is the same as or immediately after a slot in which the wireless device transmits a random access preamble for random access to a wireless communication network. The one or more selection criteria may include a type, purpose, and/or priority of the random access, of an event that triggered the random access, or of the payload. Alternatively or additionally, the one or more selection criteria may include a capability of the wireless device to transmit both the random access preamble and the payload based on the same clear channel assessment.

Embodiments herein further include corresponding apparatus, computer programs, and carriers of those computer programs. For example, embodiments herein include a wireless device, e.g., comprising communication circuitry and processing circuitry. The wireless device is configured to select an occasion or resource unit to use for transmitting a payload within a slot that is the same as or immediately after a slot in which the wireless device transmits a random access preamble for random access to a wireless communication network. The occasion or resource unit is selected based on one or more selection criteria. The one or more selection criteria may include a type, purpose, and/or priority of the random access, of an event that triggered the random access, or of the payload. Alternatively or additionally, the one or more selection criteria may include a capability of the wireless device to transmit both the random access preamble and the payload based on the same clear channel assessment. Regardless, the wireless device may further be configured to transmit the payload using the selected occasion or resource unit.

Embodiments herein also include a network node, e.g., comprising communication circuitry and processing circuitry. The network node is configured to transmit configuration signaling to a wireless device. The configuration signaling configures one or more parameters at the wireless device for selecting an occasion or resource unit based on one or more selection criteria. The occasion or resource unit is an occasion or resource unit to use for transmitting a payload within a slot that is the same as or immediately after a slot in which the wireless device transmits a random access preamble for random access to a wireless communication network. The one or more selection criteria may include a type, purpose, and/or priority of the random access, of an event that triggered the random access, or of the payload. Alternatively or additionally, the one or more selection criteria may include a capability of the wireless device to transmit both the random access preamble and the payload based on the same clear channel assessment.

BRIEF DESCRIPTION OF THE DRAWINGS

FIG. 6 is a logic flow diagram of a method performed by a wireless device according to other embodiments.

DETAILED DESCRIPTION

Figure 1:
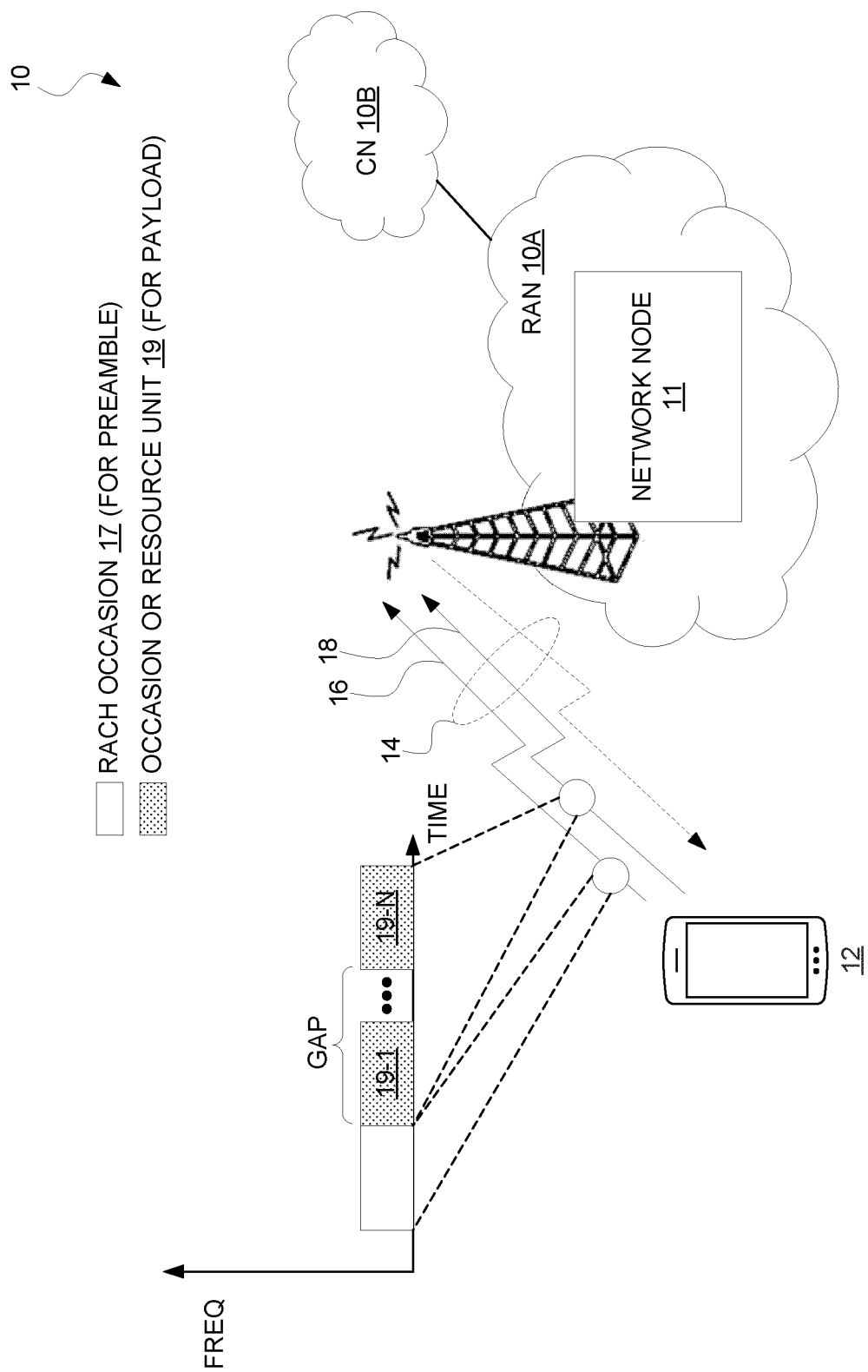
FIG. 1 is a block diagram of a wireless communication network according to some embodiments.

FIG. 1 shows a wireless communication network 10 according to some embodiments. The network 10 includes a radio access network (RAN) 10A that provides radio access to a wireless device 12. Via this radio access, the RAN 10A in turn connects the wireless device 12 to a core network (CN) 10B. The CN 10B may connect the wireless device 12 to one or more external data networks, such as the Internet.

The wireless device 12 as shown is configured to attempt to perform random access 14 to the network 10, e.g., towards a network node 11 (e.g., a base station). The random access 14 may for instance be performed in order to acquire uplink synchronization and/or an uplink grant. In some embodiments, the random access 14 is attempted according to a so-called two-step random access procedure. Regardless, as part of random access 14, the wireless device 12 is configured to transmit a random access preamble 16 within a random access channel (RACH) occasion 17, also denoted as RO herein. The wireless device 12 is also configured to transmit a payload 18, e.g., a control message, such as a connection establishment or resume request, or data. Such payload 18 may be transmitted within an occasion (e.g., a Physical Uplink Shared Channel, PUSCH, occasion, also denoted PO) or a resource unit (e.g., a PUSCH resource unit, PRU) 19. In some embodiments, a resource unit in this regard is defined as a combination of an occasion and a reference signal sequence and/or port (e.g., a demodulation reference signal, DMRS, sequence and/or port). Regardless, at least in embodiments wherein the random access 14 is a two-step procedure, the wireless device 12 transmits the payload 18 within a slot (or subframe) that is the same as or immediately after a slot (or subframe) in which the wireless device 12 transmits the random access preamble 16. Alternatively or additionally, the wireless device 12 transmits the payload 18 before the wireless device 12 receives a response from the network node 11 to the random access preamble 16.

In some embodiments, multiple occasions or resource units 19 may be defined or otherwise selectable for use in transmitting the payload 18. As shown in FIG. 1, for instance, N occasions or resource units 19, denoted as occasions or resource units 19-1 . . . 19-N, are selectable for transmitting the payload 18 within. At least some of these N occasions or resource units 19 may be distributed in time. This means that at least some of the N occasions or resource units 19 may have different gaps in time, if any, between the end of the transmission of the random access preamble 16 in the RACH occasion 18 and the start of that occasion or resource unit 19. As shown, for instance, occasion or resource unit 19-1 has no gap in time between the end of the transmission of the random access preamble 16 in the RACH occasion 17 and the start of that occasion or resource unit 19-1. By contrast, occasion or resource unit 19-N indeed has some gap in time between the end of the transmission of the random access preamble 16 in the RACH occasion 17 and the start of that occasion or resource unit 19-N.

In some embodiments where random access 14 is performed in unlicensed frequency spectrum, the gap in time, if any, between the end of the transmission of the random access preamble 16 in the RACH occasion 17 and the start of the occasion or resource unit 19 in which the wireless device 12 transmits the payload 18 governs or impacts clear channel assessment requirements for the random access 14. If the gap is more than a certain threshold (e.g., 16 us), the wireless device 12 is required to perform two successful clear channel assessments (e.g., two listen-before-talk procedures, LBTs), one before transmitting the preamble 16 in the RACH occasion 17 and another one before transmitting the payload 18 in the occasion or resource unit 19. But if the gap is less than or equal to the certain threshold (e.g., 16 us), the wireless device 12 is only required to perform one successful clear channel assessment (e.g., LBT) before transmitting both the preamble 16 and the payload 18; that is, the device 12 need only perform a single clear channel assessment in order to assess whether the unlicensed frequency spectrum is clear for the wireless device 12 to transmit both the preamble 16 and the payload 18. Performing only one clear channel assessment, rather than two, reduces the chance that clear channel assessment will fail and thereby increase the latency of the random access 14.

According to some embodiments, the wireless device 12 performs and/or the network node 11 controls random access 14 to reduce the latency of random access 14 for at least some random access attempts, such as high priority random access attempts. For example, some embodiments facilitate transmitting the payload 18 within a certain amount of time (e.g., 16 us) after transmitting the random access preamble 16, at least for some random access attempts (e.g., high priority random access attempts). This way, the wireless device 12 need only perform one clear channel assessment for both the preamble transmission and the payload transmission, rather than two clear channel assessments, one for the preamble transmission and one for the payload transmission.

For example, the wireless device 12 according to some embodiments selects the occasion or resource unit 19 to use for transmitting the payload 18 based on one or more selection criteria. The one or more selection criteria may include for instance a type, purpose, and/or priority of the random access 14, of an event that triggered the random access 14, or of the payload 18. The selection criteria may alternatively or additionally include a gap in time between an end of a transmission of the random access preamble 16 and a start of the occasion or resource unit 19. The selection criteria in other embodiments may alternatively or additionally include a capability of the wireless device 12 to transmit both the random access preamble 16 and the payload 18 based on the same clear channel assessment.

Where the selection criteria includes said priority, for example, the wireless device 12 may select an occasion or resource unit 19 that starts less than or equal to a first threshold amount of time (e.g., 16 us) or more than a second threshold amount of time (e.g., 16 us or 25 us) after the end of the transmission of the random access preamble 16, depending respectively on whether said priority is a first priority level or a second priority level. Here, the first priority level is higher than the second priority level. This way, if the occasion or resource unit starts less than or equal to the first threshold amount of time, the wireless device 12 may transmit the payload 18 based on the clear channel assessment already successfully performed for transmission of the preamble 16. Accordingly, the wireless device 12 may perform either a single clear channel assessment to assess whether the unlicensed frequency spectrum is clear for the wireless device 12 to transmit both the random access preamble 16 and the payload 18, or perform two clear channel assessments, one to assess whether the unlicensed frequency spectrum is clear for the wireless device 12 to transmit the random access preamble 16 and another to assess whether the unlicensed frequency spectrum is clear for the wireless device 12 to transmit the payload 18, depending respectively on whether or not the selected occasion or resource unit 19 starts less than or equal to the first threshold amount of time after the end of the transmission of the random access preamble 16.

As shown in FIG. 1, for example, if the priority of the random access 14, of an event that triggered the random access 14, or of the payload 18 is the first priority level (e.g., high priority), the wireless device 12 may select the occasion or resource unit 19-1 which has no gap between the end of the transmission of the preamble 16 in the RACH occasion 17 and the start of that occasion or resource unit 19-1. In this case, as a condition for transmitting the preamble 16, the wireless device 12 may perform a clear channel assessment to assess whether the unlicensed frequency spectrum is clear for the wireless device 12 to transmit the random access preamble 16. If that clear channel assessment indicates the spectrum is clear, the wireless device 12 may proceed to transmit both the preamble in the RACH occasion 17 as well as the payload 18 in the selected occasion or resource unit 19-1, without having to perform another clear channel assessment as a condition for transmitting the payload 18. On the other hand, if the priority of the random access 14, of an event that triggered the random access 14, or of the payload 18 is the second priority level (e.g., low priority), the wireless device 12 may select the occasion or resource unit 19-N which has a gap (or a larger gap) between the end of the transmission of the preamble 16 in the RACH occasion 17 and the start of that occasion or resource unit 19-N. The gap may for instance exceed a second threshold (e.g., 16 us or 25 us). In this case, as a condition for transmitting the preamble 16, the wireless device 12 may perform a clear channel assessment to assess whether the unlicensed frequency spectrum is clear for the wireless device 12 to transmit the random access preamble 16. If that clear channel assessment indicates the spectrum is clear, the wireless device 12 may proceed to transmit the preamble 16 in the RACH occasion 17. But, as a separate condition for transmitting the payload 18, the wireless device 12 may also perform another clear channel assessment to assess whether the unlicensed frequency spectrum is clear for the wireless device 12 to transmit the payload in the occasion or resource unit 19-N. If that clear channel assessment indicates the spectrum is clear, the wireless device 12 may proceed to transmit the payload 18 in the occasion or resource unit 19-N. But if that clear channel assessment does not indicate the spectrum is clear, the wireless device 12 must back off transmission of the payload 18, even if the clear channel assessment indicated the spectrum was clear for transmission of the preamble 16.

In these and other embodiments, the payload 18 may be transmitted in an earlier occasion or resource unit 19 (and with fewer requisite clear channel assessments) under some circumstances, e.g., for one or more certain types, purposes, and/or priorities of random access, random access triggering events, or payloads. In one embodiment, for example, random access is prioritized (e.g., with the first priority level above) if the random access is triggered for a handover of the wireless device 12 and/or if the random access is triggered for Radio Resource Control, RRC, re-establishment in order to recover from failure of a radio link or beam. Alternatively or additionally, random access is prioritized (e.g., with the first priority level above) if the random access is triggered by failure of the wireless device to find a valid physical uplink control channel resource for transmitting a scheduling request according to a scheduling request configuration that is mapped to a logical channel with a priority level above a priority level threshold.

In still other embodiments, the payload 18 may be transmitted in an earlier occasion or resource unit 19 (and with fewer requisite clear channel assessments) for wireless devices with a certain capability and/or for wireless devices of a certain type. Such capability and/or type may for instance be associated with a certain type, purpose, and/or priority of random access or of a service.

Note that although FIG. 1 shows that each selectable occasion or resource unit 19-1 . . . 19-N has a different gap (if any), in other embodiments there may be multiple occasions or resource units 19 with the same gap. In this case, the wireless device 12 in some embodiments may randomly select an occasion or resource unit 19 from among the occasions or resource units 19 that meet certain requirements regarding the gap (if any).

Note also that although FIG. 1 showed a single RACH occasion 17 and preamble 16, there may be multiple RACH occasions 17 and/or multiple preambles 16 available for selection by the wireless device 12.

In fact, in some embodiments, the wireless device 12 selects a random access preamble 16 or a random access channel occasion 17 to use for the random access 14. The wireless device 12 then determines, from among different sets of occasions or resources units that are respectively associated with different random access preambles or different random access channel occasions, the set of occasions or resource units which is associated with the selected random access preamble or random access channel occasion. The wireless device 12 may then select the occasion or resource unit 19 to use for transmitting the payload 18 from among the occasions or resource units in the determined set, based on the one or more selection criteria. If multiple occasions or resource units in the determined set meet the one or more selection criteria, the wireless device 12 may randomly select from among those multiple occasions or resource units.

In still other embodiments, the wireless device 12 may select, from among different groups of random access preambles or random access channel occasions, a group to use for attempting random access 14 to the wireless communication network 10, based on one or more parameters that govern or impact clear channel assessment for said random access 14. The wireless device 12 may then attempt random access in unlicensed frequency spectrum using a random access preamble or random access channel occasion in the selected group.

Generally, then, the wireless device 12 according to some embodiments may select an occasion or resource unit 19 to use for transmitting the payload 18, may select a preamble 16 and/or random access channel occasion 17, and/or may select a beam on which to attempt random access 14 (e.g., via selection of a reference signal), based on one or more parameters that govern or impact clear channel assessment for the random access.

Figure 2:
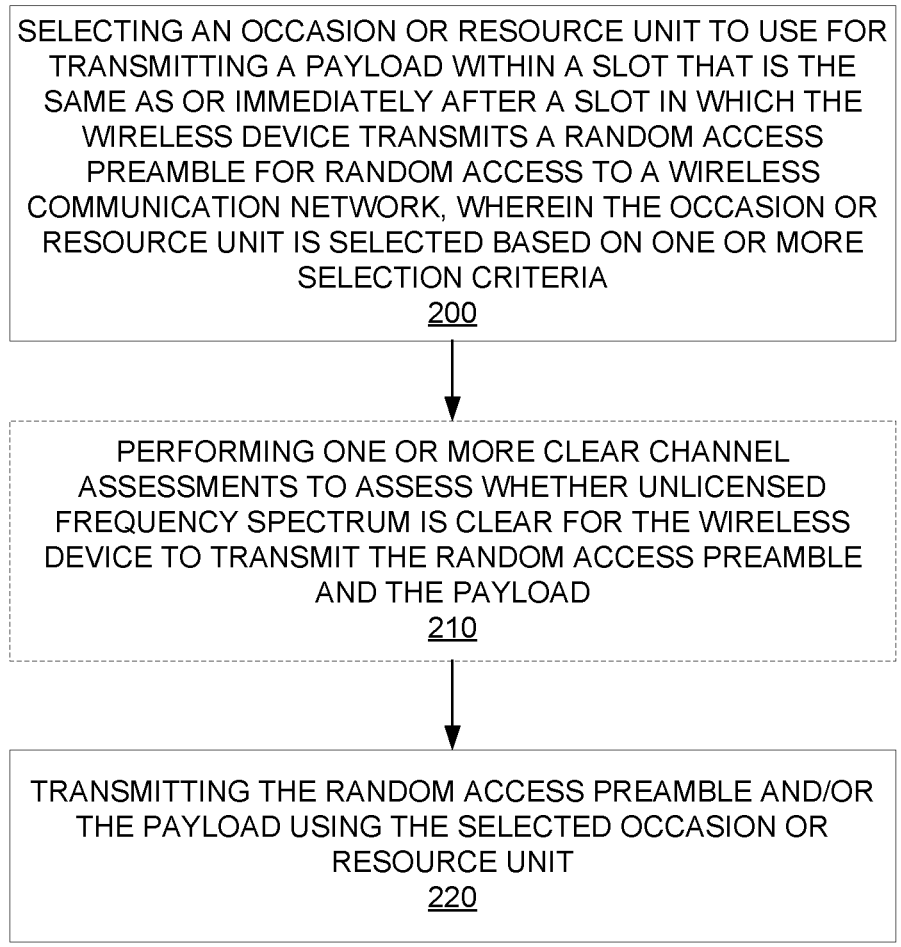
FIG. 2 is a logic flow diagram of a method performed by a wireless device according to some embodiments.

In view of the above modifications and variations, FIG. 2 depicts a method performed by a wireless device 12 in accordance with particular embodiments. The method includes selecting an occasion or resource unit 19 to use for transmitting a payload 18 within a slot that is the same as or immediately after a slot in which the wireless device 12 transmits a random access preamble 16 for random access 14 to a wireless communication network 10 (Block 200). In some embodiments, the occasion or resource unit 19 is selected based on one or more selection criteria. For example, the one or more selection criteria may include a type, purpose, and/or priority of the random access 14, of an event that triggered the random access 14, or of the payload 18. Alternatively or additionally, the one or more selection criteria may include a gap in time between an end of a transmission of the random access preamble 16 and a start of the occasion or resource unit 19. Alternatively or additionally, the one or more selection criteria may include a capability of the wireless device 12 to transmit both the random access preamble 16 and the payload 18 based on the same clear channel assessment.

The method may also include transmitting the payload 18 using the selected occasion or resource unit 19 (Block 220).

In some embodiments, the method further includes performing one or more clear channel assessments to assess whether unlicensed frequency spectrum is clear for the wireless device 12 to transmit the random access preamble 16 and the payload 18 (Block 210). In this case, transmitting the random access preamble 16 and/or the payload 18 using the selected occasion or resource unit 19 may be performed responsive to the one or more clear channel assessments indicating that the unlicensed frequency spectrum is clear for the wireless device 12 to transmit the random access preamble 16 and/or the payload 18.

In some embodiments, selecting the occasion or resource unit 19 to use comprises selecting an occasion or resource unit 19 that starts less than or equal to a first threshold amount of time or more than a second threshold amount of time after an end of the transmission of the random access preamble 16, depending respectively on whether said priority is a first priority level or a second priority level. In this case, the first priority level is higher than the second priority level, and the first threshold amount of time is the same as or different than the second threshold amount of time.

In one or more such embodiments, the method further comprises performing either a single clear channel assessment to assess whether unlicensed frequency spectrum is clear for the wireless device 12 to transmit both the random access preamble 16 and the payload 18, or performing two clear channel assessments, one to assess whether the unlicensed frequency spectrum is clear for the wireless device 12 to transmit the random access preamble 16 and another to assess whether the unlicensed frequency spectrum is clear for the wireless device 12 to transmit the payload 18, depending respectively on whether or not the selected occasion or resource unit 19 starts less than or equal to the first threshold amount of time after the end of the transmission of the random access preamble 16.

Alternatively or additionally, in some embodiments, the method further comprises selecting a random access preamble 16 or a random access channel occasion to use for the random access 14. In this case, selecting the occasion or resource unit 19 to use for transmitting the payload 18 may comprise determining, from among different sets of occasions or resources units that are respectively associated with different random access preambles or different random access channel occasions, the set of occasions or resource units which is associated with the selected random access preamble or random access channel occasion. The method may then comprise selecting the occasion or resource unit 19 to use for transmitting the payload from among the occasions or resource units in the determined set, based on the one or more selection criteria. In one such embodiment, selecting the occasion or resource unit 19 to use for transmitting the payload 18 further comprises randomly selecting the occasion or resource unit 19 to use from among multiple occasions or resource units in the determined set that meet the one or more selection criteria.

In some embodiments, the one or more selection criteria include said priority. Alternatively or additionally, the one or more selection criteria in some embodiments include said gap in time, if any, between the end of the transmission of the random access preamble 16 and a start of the occasion or resource unit 19. Alternatively or additionally, the one or more selection criteria in some embodiments include said capability.

In some embodiments, the random access 14 is a two-step random access, the random access preamble 16 and the payload 18 are included in a MsgA transmission, and the payload 18 is a payload of a Physical Uplink Shared Channel, PUSCH.

In some embodiments, the selected occasion or resource unit 19 is a PUSCH occasion (PO) or a PUSCH resource unit (PRU), and a PUSCH resource unit is a combination of a PUSCH occasion and a Demodulation Reference Signal port or sequence.

In some embodiments, the method further comprises performing one or more clear channel assessments to assess whether unlicensed frequency spectrum is clear for the wireless device 12 to transmit the random access preamble 16 and the payload 18. In this case, transmitting may comprise transmitting the random access preamble 16 and/or the payload 18 using the selected occasion or resource unit 19, responsive to the one or more clear channel assessments indicating that the unlicensed frequency spectrum is clear for the wireless device 12 to transmit the random access preamble 16 and/or the payload 18.

In some embodiments, the random access 14 is prioritized above one or more other random accesses if: the random access 14 is triggered for a handover of the wireless device 12; or the random access 14 is triggered for Radio Resource Control, RRC, re-establishment in order to recover from failure of a radio link or beam.

In some embodiments, the random access 14 is prioritized above one or more other random accesses if the random access 14 is triggered by failure of the wireless device 12 to find a valid physical uplink control channel resource for transmitting a scheduling request according to a scheduling request configuration that is mapped to a logical channel with a priority level above a priority level threshold.

In some embodiments, selecting the occasion or resource unit 19 to use comprises selecting the occasion or resource unit from among different occasions or resource units configured for different channels. In this case, the occasion or resource unit 19 may be selected based on channel occupancy and/or clear channel assessment failure statistics for the different channels. In one such case, selecting the occasion or resource unit 19 to use comprises favoring a occasion or resource unit configured for a first channel that has a lower channel occupancy or occurrence of clear channel assessment failures than a second channel for which another occasion or resource unit is configured. Alternatively or additionally, the different channels may be or may be associated with different subbands, bandwidth parts, or cells.

In some embodiments, the method further comprises receiving configuration signaling that configures one or more parameters at the wireless device 12 for selecting the occasion or resource unit 19 based on the one or more selection criteria.

In some embodiments, transmitting the payload 18 comprises transmitting the payload 18 in unlicensed frequency spectrum.

Figure 3:
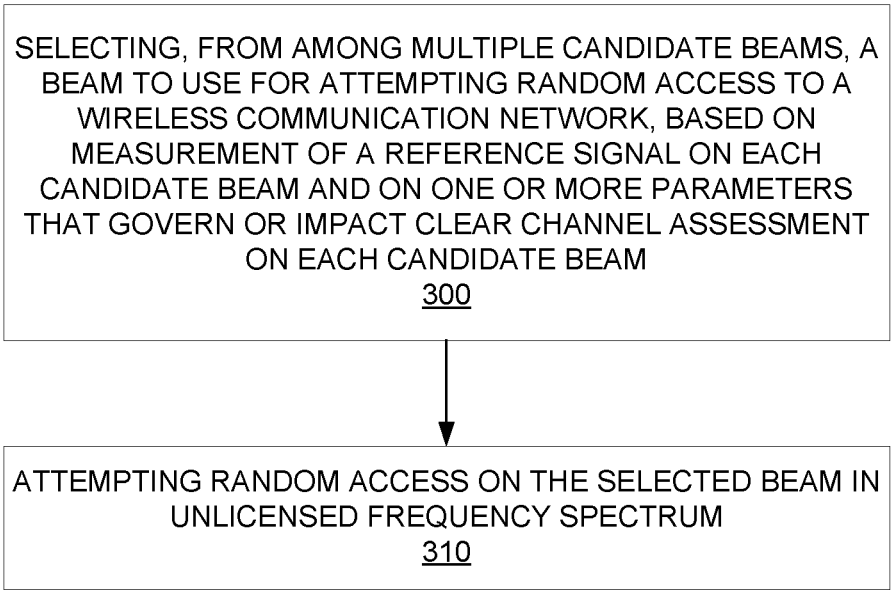
FIG. 3 is a logic flow diagram of a method performed by a wireless device according to other embodiments.

FIG. 3 depicts a method performed by a wireless device 12 in accordance with other particular embodiments. The method includes selecting, from among multiple candidate beams, a beam to use for attempting random access (e.g., a two-step random access) to a wireless communication network 10, based on measurement of a reference signal on each candidate beam and on one or more parameters that govern or impact clear channel assessment on each candidate beam (Block 300). Such selection may for example select the beam from a table that maps different values of the one or more parameters to different ones of the candidate beams. Regardless, the method may also include attempting random access 14 on the selected beam in unlicensed frequency spectrum (Block 310).

In some embodiments, the one or more parameters that govern or impact clear channel assessment on a candidate beam include a gap in time between an end of a random access channel occasion on the candidate beam and a start of an occasion or resource unit to use for transmitting a payload 18 on the candidate beam within a slot that is the same as or immediately after a slot in which the random access channel occasion occurs. In one such embodiment, the occasion or resource unit is a PUSCH occasion or a PUSCH resource unit, and a PUSCH resource unit is a combination of a PUSCH occasion and a Demodulation Reference Signal port or sequence.

In some embodiments, the one or more parameters that govern or impact clear channel assessment on a candidate beam include a number of clear channel assessments required to assess whether the unlicensed frequency spectrum is clear for the wireless device 12 to transmit a random access preamble 16 and a payload 18 on the candidate beam within the same slot or within successive slots.

Alternatively or additionally, the one or more parameters that govern or impact clear channel assessment on a candidate beam in some embodiments include a type of one or more clear channel assessments required to assess whether the unlicensed frequency spectrum is clear for the wireless device 12 to transmit a random access preamble 16 and a payload 18 on the candidate beam within the same slot or within successive slots.

Figure 4:
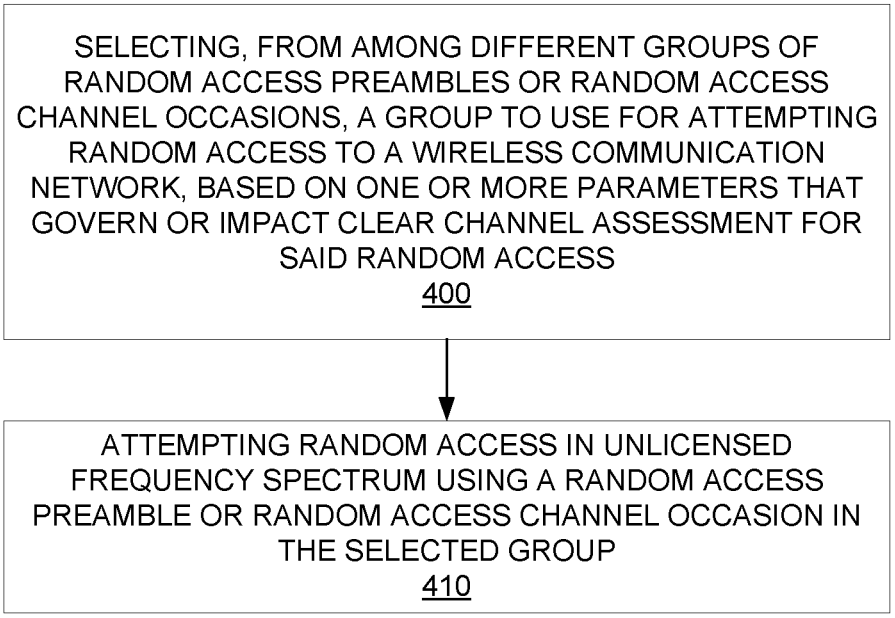
FIG. 4 is a logic flow diagram of a method performed by a wireless device according to still other embodiments.

FIG. 4 depicts a method performed by a wireless device 12 in accordance with other particular embodiments. The method includes selecting, from among different groups of random access preambles or random access channel occasions, a group to use for attempting random access 14 (e.g., a two-step random access) to a wireless communication network 10, based on one or more parameters that govern or impact clear channel assessment for said random access 14 (Block 400). The method may also include attempting random access in unlicensed frequency spectrum using a random access preamble or random access channel occasion in the selected group (Block 410).

In some embodiments, the different groups are associated with different values for the one or more parameters.

In some embodiments, the one or more parameters govern or impact clear channel assessment required to assess whether the unlicensed frequency spectrum is clear for the wireless device 12 to transmit a random access preamble 16 and a payload 18 within the same slot or within successive slots.

In some embodiments, the one or more parameters include one or more of: a category of clear channel assessment required to assess whether the unlicensed frequency spectrum is clear for the wireless device 12 to transmit a random access preamble 16 and a payload 18 within the same slot or within successive slots; a channel access priority class for said payload 18; a priority level of said random access; a purpose of said random access 14; or a type of event which triggered said random access 14.

Figure 5:
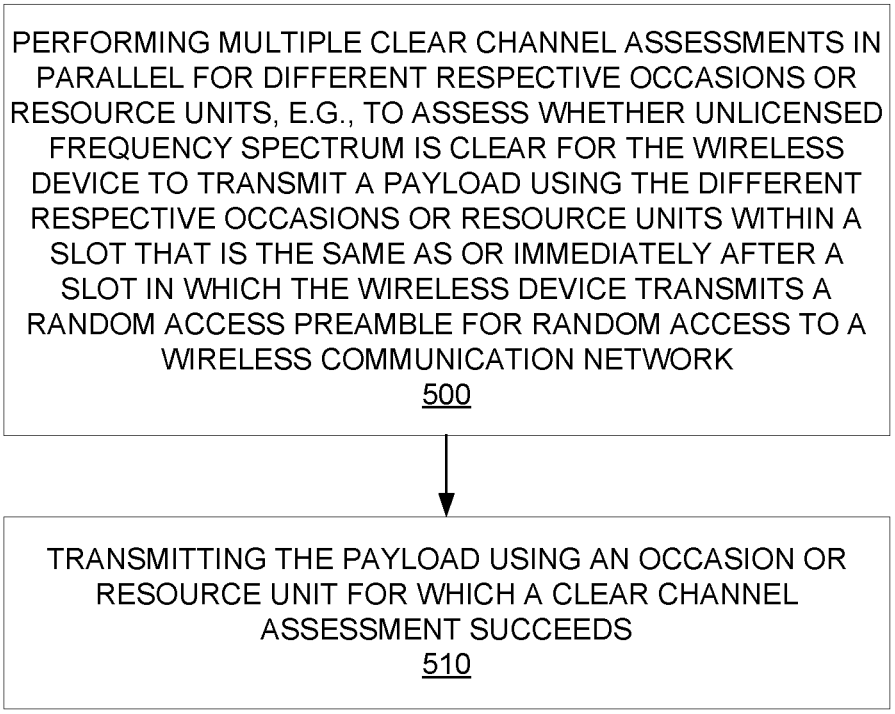
FIG. 5 is a logic flow diagram of a method performed by a wireless device according to yet other embodiments.

FIG. 5 depicts a method performed by a wireless device 12 in accordance with other particular embodiments. The method includes performing multiple clear channel assessments in parallel for different respective occasions or resource units, e.g., to assess whether unlicensed frequency spectrum is clear for the wireless device 12 to transmit a payload 18 using the different respective occasions or resource units within a slot that is the same as or immediately after a slot in which the wireless device 12 transmits a random access preamble 16 for random access 14 to a wireless communication network 10 (Block 500). The method may also include transmitting the payload 18 using an occasion or resource unit for which a clear channel assessment succeeds (Block 510).

In some embodiments, the different occasions or resource units are located in different parts of the unlicensed frequency spectrum.

In some embodiments, the different occasions or resource units are located in different frequency subbands, different bandwidth parts, or different cells.

In some embodiments, the random access 14 is a two-step random access, where the random access preamble 16 and the payload 18 are included in a MsgA transmission, and where the payload 18 is a payload of a Physical Uplink Shared Channel, PUSCH.

In some embodiments, the different occasions or resource units are each a PUSCH occasion or a PUSCH resource unit, where a PUSCH resource unit is a combination of a PUSCH occasion and a Demodulation Reference Signal port or sequence.

FIG. 6 depicts a method performed by a wireless device 12 in accordance with other particular embodiments. The method includes performing a first clear channel assessment for a first occasion or resource unit, e.g., to assess whether unlicensed frequency spectrum is clear for the wireless device 12 to transmit a payload 18 using the first occasion or resource unit within a slot that is the same as or immediately after a slot in which the wireless device 12 transmits a random access preamble 16 for random access 14 to a wireless communication network 10 (Block 600). The method may also include, responsive to the first clear channel assessment indicating the unlicensed frequency spectrum is not clear for the wireless device 12 to transmit the payload 18 using the first occasion or resource unit, selecting a second occasion or resource unit that is located in a different part of the unlicensed frequency spectrum (Block 610). The method may further include performing a second clear channel assessment for the second occasion or resource unit, e.g., to assess whether the unlicensed frequency spectrum is clear for the wireless device 12 to transmit a payload 18 using the second occasion or resource unit within a slot that is the same as or immediately after a slot in which the wireless device 12 transmits a random access preamble 16 for random access 14 to a wireless communication network (Block 620).

In some embodiments, the method may also include applying a different channel access priority class to the payload 18 for the second clear channel assessment.

In some embodiments, the method further comprises transmitting the payload using the second occasion or resource unit.

In some embodiments, the second occasion or resource unit is located in a different frequency subband, different bandwidth part, or different cell than the first occasion or resource unit.

In some embodiments, the random access 14 is a two-step random access, the random access preamble and the payload are included in a MsgA transmission, and the payload 18 is a payload of a Physical Uplink Shared Channel, PUSCH.

In some embodiments, the first and second occasions or resource units are each a PUSCH occasion or a PUSCH resource unit, and a PUSCH resource unit is a combination of a PUSCH occasion and a Demodulation Reference Signal port or sequence.

In some embodiments, the second clear channel assessment is a different category of clear channel assessment than the first clear channel assessment.

In some embodiments, the method further comprises applying a different channel access priority class to the payload 18 for the second clear channel assessment.

Figure 7:
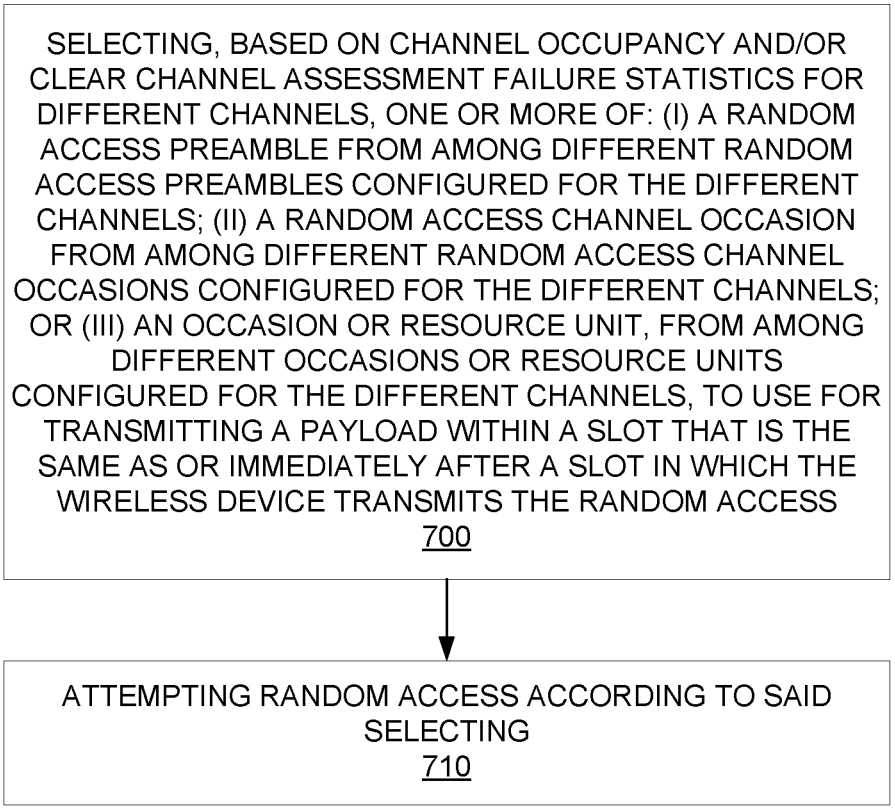
FIG. 7 is a logic flow diagram of a method performed by a wireless device according to still other embodiments.

FIG. 7 depicts a method performed by a wireless device 12 in accordance with other particular embodiments. The method includes selecting, based on channel occupancy and/or clear channel assessment failure statistics for different channels, one or more of: (i) a random access preamble 16 from among different random access preambles configured for the different channels; (ii) a random access channel occasion from among different random access channel occasions configured for the different channels; or (iii) an occasion or resource unit 19, from among different occasions or resource units configured for the different channels, to use for transmitting a payload 18 within a slot that is the same as or immediately after a slot in which the wireless device 12 transmits the random access preamble 16 (Block 700). The method may also include attempting random access 14 according to said selecting (Block 710).

In some embodiments, selecting comprises favoring a random access preamble 16, random access channel occasion, or occasion or resource unit 19 configured for a first channel that has a lower channel occupancy or occurrence of clear channel assessment failures than a second channel for which another random access preamble, random access channel occasion, or occasion or resource unit is configured.

In some embodiments, the different channels are or are associated with different subbands, bandwidth parts, or cells.

Although not shown, other embodiments herein include a method performed by a wireless device 12. The method comprises receiving configuration signaling from a network node 11, e.g., where the configuration signaling configures one or more parameters at the wireless device 12 for performing any of the steps of any of embodiments herein.

Figure 8:
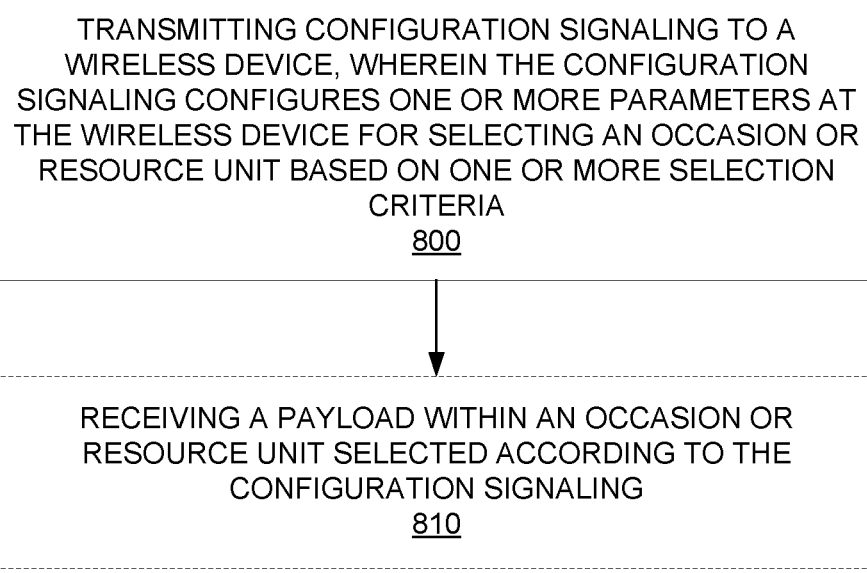
FIG. 8 is a logic flow diagram of a method performed by a network node according to some embodiments.

FIG. 8 depicts a corresponding method performed by a network node 11 in accordance with some embodiments. The method includes transmitting configuration signaling to a wireless device 12 (Block 800). The configuration signaling may for instance configure one or more parameters at the wireless device 12 for performing any of the steps of any of embodiments herein.

In one such embodiment, for example, the configuration signaling configures one or more parameters at the wireless device 12 for selecting an occasion or resource unit 19 based on one or more selection criteria. The occasion or resource unit 19 is an occasion or resource unit to use for transmitting a payload 18 within a slot that is the same as or immediately after a slot in which the wireless device 12 transmits a random access preamble 16 for random access 14 to a wireless communication network 10. The one or more selection criteria may include a type, purpose, and/or priority of the random access 14, of an event that triggered the random access 14, or of the payload 18. Alternatively or additionally, the one or more selection criteria may include a capability of the wireless device 12 to transmit both the random access preamble 16 and the payload 18 based on the same clear channel assessment.

In some embodiments, the method further comprises receiving the payload 18 within an occasion or resource unit 19 selected according to the configuration signaling (Block 810).

Embodiments herein also include corresponding apparatuses. Embodiments herein for instance include a wireless device 12 configured to perform any of the steps of any of the embodiments described above for the wireless device 12.

Embodiments also include a wireless device 12 comprising processing circuitry and power supply circuitry. The processing circuitry is configured to perform any of the steps of any of the embodiments described above for the wireless device 12. The power supply circuitry is configured to supply power to the wireless device 12.

Embodiments further include a wireless device 12 comprising processing circuitry. The processing circuitry is configured to perform any of the steps of any of the embodiments described above for the wireless device 12. In some embodiments, the wireless device 12 further comprises communication circuitry.

Embodiments further include a wireless device 12 comprising processing circuitry and memory. The memory contains instructions executable by the processing circuitry whereby the wireless device 12 is configured to perform any of the steps of any of the embodiments described above for the wireless device 12.

Embodiments moreover include a user equipment (UE). The UE comprises an antenna configured to send and receive wireless signals. The UE also comprises radio front-end circuitry connected to the antenna and to processing circuitry, and configured to condition signals communicated between the antenna and the processing circuitry. The processing circuitry is configured to perform any of the steps of any of the embodiments described above for the wireless device 12. In some embodiments, the UE also comprises an input interface connected to the processing circuitry and configured to allow input of information into the UE to be processed by the processing circuitry. The UE may comprise an output interface connected to the processing circuitry and configured to output information from the UE that has been processed by the processing circuitry. The UE may also comprise a battery connected to the processing circuitry and configured to supply power to the UE.

Embodiments herein also include a network node 11 configured to perform any of the steps of any of the embodiments described above for the network node 11.

Embodiments also include a network node 11 comprising processing circuitry and power supply circuitry. The processing circuitry is configured to perform any of the steps of any of the embodiments described above for the network node 11. The power supply circuitry is configured to supply power to the network node 11.

Embodiments further include a network node 11 comprising processing circuitry. The processing circuitry is configured to perform any of the steps of any of the embodiments described above for the network node 11. In some embodiments, the network node 11 further comprises communication circuitry.

Embodiments further include a network node 11 comprising processing circuitry and memory. The memory contains instructions executable by the processing circuitry whereby the network node 11 is configured to perform any of the steps of any of the embodiments described above for the network node 11.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 9:
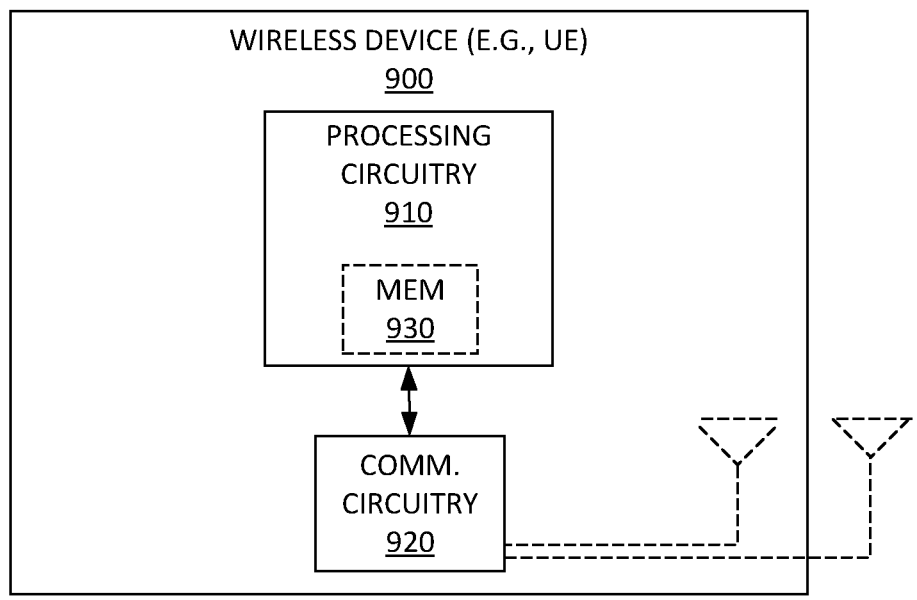
FIG. 9 is a block diagram of a wireless device according to some embodiments.

FIG. 9 for example illustrates a wireless device 900 (e.g., wireless device 12) as implemented in accordance with one or more embodiments. As shown, the wireless device 900 includes processing circuitry 910 and communication circuitry 920. The communication circuitry 920 (e.g., radio circuitry) is configured to transmit and/or receive information to and/or from one or more other nodes, e.g., via any communication technology. Such communication may occur via one or more antennas that are either internal or external to the wireless device 900. The processing circuitry 910 is configured to perform processing described above, such as by executing instructions stored in memory 930. The processing circuitry 910 in this regard may implement certain functional means, units, or modules.

Figure 10:
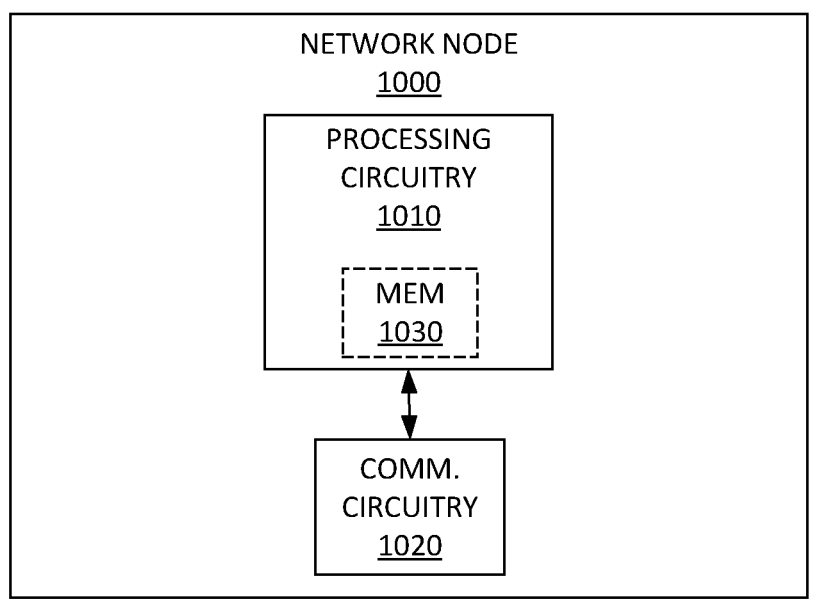
FIG. 10 is a block diagram of a network node according to some embodiments.

FIG. 10 illustrates a network node 1000 (e.g., network node 11) as implemented in accordance with one or more embodiments. As shown, the network node 1000 includes processing circuitry 1010 and communication circuitry 1020. The communication circuitry 1020 is configured to transmit and/or receive information to and/or from one or more other nodes, e.g., via any communication technology. The processing circuitry 1010 is configured to perform processing described above, such as by executing instructions stored in memory 1030. The processing circuitry 1010 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described. In the following, random access 14 in FIG. 1 is exemplified as a two-step random access, the random access preamble 16 and the payload 18 are exemplified as being included in a MsgA transmission, and the payload 18 is a payload of a Physical Uplink Shared Channel, PUSCH. Alternatively or additionally, the selected occasion or resource unit 19 may be exemplified as a PUSCH occasion (PO) or a PUSCH resource unit (PRU). Here, a PUSCH resource unit is a combination of a PO and a Demodulation Reference Signal (DMRS) port or sequence.

More particularly in this regard, some embodiments herein are applicable in next generation systems that support a wide range of use cases with varying requirements ranging from fully mobile devices to stationary Internet of Things (IoT) or fixed wireless broadband devices. The traffic pattern associated with many use cases may consist of short or long bursts of data traffic with varying length of waiting period in between (here called inactive state). In New Radio (NR), both license assisted access and standalone operation in unlicensed spectrum (NR-U) are to be supported in 3GPP. In this context, some embodiments herein are applicable to the procedure of Physical Random Access Channel (PRACH) transmission and/or scheduling request (SR) transmission in unlicensed spectrum.

More particularly in this regard, a number of restrictions apply to network operation in unlicensed frequency spectrum. One of them is that a device (e.g. a radio network node or a mobile terminal) has to monitor the shared medium, i.e. the channel, and determine that it is free (not being used by any other device) before starting to transmit on the channel. This procedure is referred to as Listen-Before-Talk (LBT) or Clear Channel Assessment (CCA).

More particularly, compared to Long Term Evolution (LTE) Licensed-Assisted Access (LAA), NR Unlicensed (NR-U) embodiments may support dual connectivity (DC) and standalone scenarios, where the Medium Access Control (MAC) procedures including Random Access Channel (RACH) and scheduling procedure on unlicensed spectrum are subject to LBT and thus potential LBT failures. In LTE LAA, there are no such issues since the RACH and scheduling related signaling can be transmitted on the PCell in licensed spectrum instead of unlicensed spectrum.

For discovery reference signal (DRS) transmission, such as Primary Synchronization Signal (PSS)/Secondary Synchronization Signal (SSS), Physical Broadcast Channel (PBCH), Channel State Information Reference Signal (CSI-RS), control channel transmission such as Physical Uplink Control Channel (PUCCH)/Physical Downlink Control Channel (PDCCH), physical data channel such as Physical Uplink Shared Channel (PUSCH)/Physical Downlink Shared Channel (PDSCH), and uplink sounding reference signal such as Sounding Reference Signal (SRS) transmission, channel sensing should be applied to determine the channel availability before the physical signal is transmitted using the channel.

Consider now the channel access procedure in NR-U according to some embodiments. Listen-before-talk (LBT) is designed for unlicensed spectrum co-existence with other radio access technologies (RATs). In this mechanism, a radio device applies a clear channel assessment (CCA) check (i.e. channel sensing) before any transmission. The transmitter performs energy detection (ED) over a time period compared to a certain energy detection threshold (ED threshold) in order to determine if a channel is idle. In case the channel is determined to be occupied, the transmitter performs a random back-off within a contention window before its next CCA attempt. In order to protect the ACK transmissions, the transmitter must defer a period after each busy CCA slot prior to resuming back-off. As soon as the transmitter has grasped access to a channel, the transmitter is only allowed to perform transmission up to a maximum time duration (namely, the maximum channel occupancy time (MOOT)). For qualify of service (QoS) differentiation, a channel access priority based on the service type has been defined. For example, four LBT priority classes are defined for differentiation of channel access priorities between services using different contention window sizes (CWS) and MOOT durations.

As described in 3GPP TR 38.889 v16.0.0, the channel access schemes for NR-based access for unlicensed spectrum can be classified into the following categories:

Cat-1: Immediate transmission after a short switching gap. This is used for a transmitter to immediately transmit after a UL/DL switching gap inside a COT. The switching gap from reception to transmission is to accommodate the transceiver turnaround time and is no longer than 16 μs.

Cat-2: LBT without random back-off. The duration of time that the channel is sensed to be idle before the transmitting entity transmits is deterministic.

Cat-3: LBT with random back-off with a contention window of fixed size. The LBT procedure has the following procedure as one of its components. The transmitting entity draws a random number N within a contention window. The size of the contention window is specified by the minimum and maximum value of N. The size of the contention window is fixed. The random number N is used in the LBT procedure to determine the duration of time that the channel is sensed to be idle before the transmitting entity transmits on the channel.

Cat-4: LBT with random back-off with a contention window of variable size. The LBT procedure has the following as one of its components. The transmitting entity draws a random number N within a contention window. The size of contention window is specified by the minimum and maximum value of N. The transmitting entity can vary the size of the contention window when drawing the random number N. The random number N is used in the LBT procedure to determine the duration of time that the channel is sensed to be idle before the transmitting entity transmits on the channel.

For different transmissions in a COT and different channels/signals to be transmitted, different categories of channel access schemes can be used.

Figure 11:
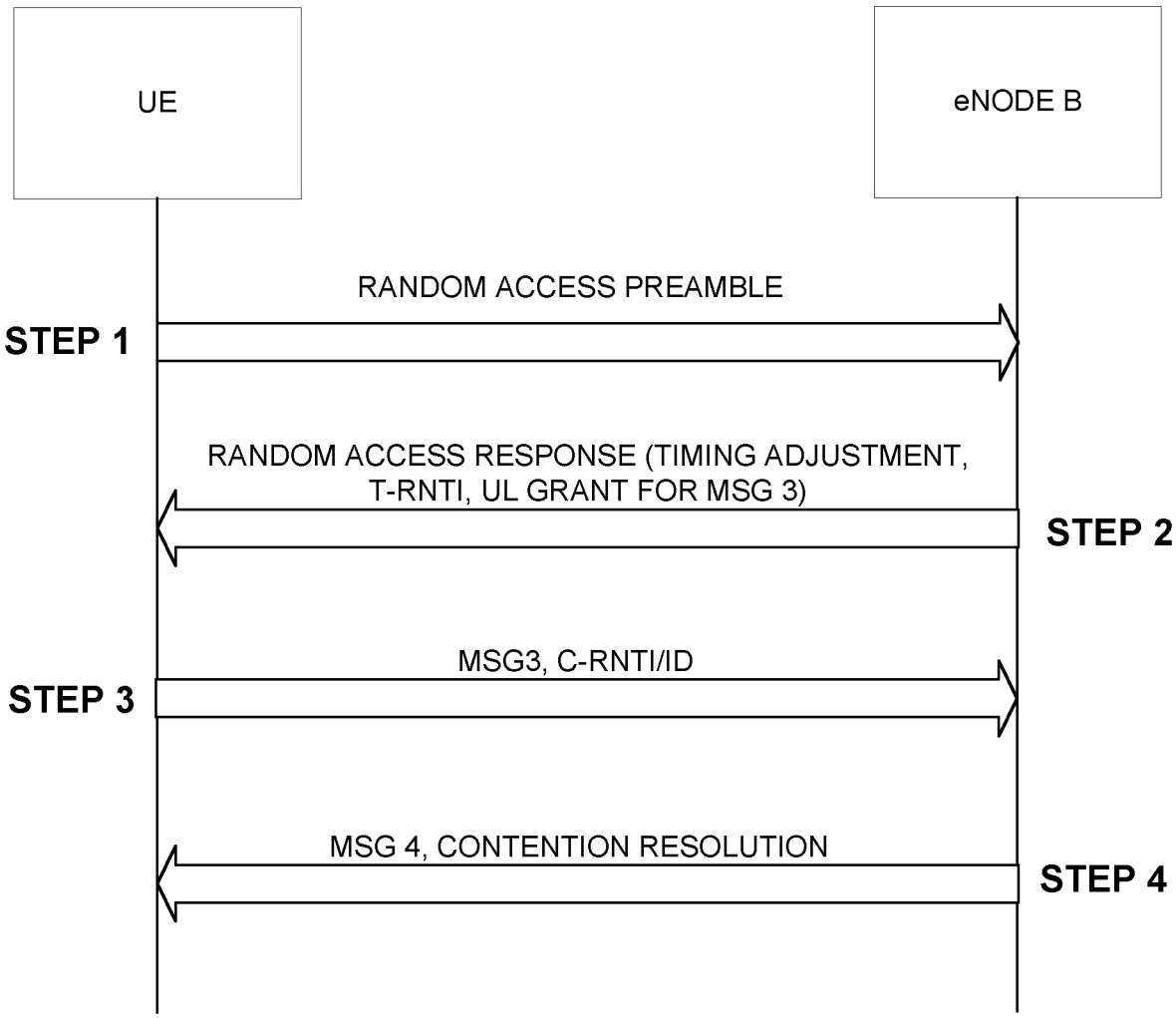
FIG. 11 is a call flow diagram of a 4-step random access procedure according to some embodiments.

Consider now RACH procedures in NR unlicensed spectrum embodiments. A four-step RA procedure, such as used in LTE and NR Rel-15, is shown in FIG. 11.

Step 1: Preamble Transmission

The UE randomly selects a RA preamble (PREAMBLE_INDEX) which is then transmitted by the UE. When the eNB detects the preamble, it estimates the Timing alignment (TA) the UE should use in order to obtain UL synchronization at the eNB.

Step 2: RA Response (RAR)

The eNB sends a RA response (RAR) including the TA, the TC-RNTI (temporary cell radio network temporary identifier) to be used by the UE, a Random Access Preamble identifier that matches the transmitted PREAMBLE_INDEX and a grant for Msg3. The UE expects the RAR and thus, monitors Physical Downlink Control Channel (PDCCH) addressed to random access radio network temporary identifier (RA-RNTI) to receive the RAR message from the eNB until the configured RAR window (ra-Response Window) has expired or until the RAR has been successfully received.

From 38.321: "The MAC entity may stop ra-Response Window (and hence monitoring for Random Access Response(s)) after successful reception of a Random Access Response containing Random Access Preamble identifiers that matches the transmitted PREAMBLE_INDEX."

Step 3: "Msg3" (UE ID or UE-specific C-RNTI) In Msg3, the UE transmits its identifier (UE ID) for initial access or—if it is already in RRC_CONNECTED or RRC_INACTIVE mode and needs to e.g. resync, its UE-specific RNTI.

If the gNB cannot decode Msg3 at the granted UL resources, it may send a downlink control information (DCI) message addressed to TC-RNTI for retransmission of Msg3. Hybrid automatic repeat request (HARQ) retransmission is requested until the UEs restart the random access procedure from step 1 after reaching the maximum number of HARQ retransmissions or until Msg3 can be successfully received by the gNB.

Step 4: "Msg4" (Contention Resolution)

In Msg4 the eNB responds by acknowledging the UE ID or C-RNTI. The Msg4 gives contention resolution, i.e. only one UE ID or C-RNTI will be sent even if several UEs have used the same preamble (and the same grant for Msg3 transmission) simultaneously.

For Msg4 reception, the UE monitors TC-RNTI (if it transmitted its UE ID in Msg3) or C-RNTI (if it transmitted its C-RNTI in Msg3).

In LTE, the four-step RA cannot be completed in less than 14 ms/TTI/SF.

According to some embodiments, a two-step RA procedure, by contrast, is where the uplink (UL) messages (PRACH+Msg3) are sent simultaneously (within the same slot or successive slots) and similarly the two downlink (DL) messages (e.g. time advance command in radio access response and contention resolution information) are sent as a simultaneous response in the DL. In the legacy four step procedure, one major purpose of the first two messages is to obtain UL time alignment for the UE. In many situations, e.g. in small cells or for stationary UEs, this may not be needed since either a timing advance (TA)=0 will be sufficient (small cells) or a stored TA value from the last RA could serve also for the current RA (stationary UE). In future radio networks it can be expected that these situations are common, both due to dense deployments of small cells and a great number of e.g. stationary IoT devices. A possibility to skip the message exchange in cases when there is no need to obtain the TA value would lead to reduced RA latency and would be beneficial in several use cases, for example when transmitting infrequent small data packets. On the other hand, the two-step RA will consume more resources since it uses contention-based transmission of the data. This means that the resources that are configured for the data transmission may often be unused.

If both the four-step and two-step RA are configured in a cell (and for the UE), the UE will choose its preamble from one specific set if it wants to do a four-step RA, and from another set if it wants to do a two-step RA. Hence a preamble partition is done to distinguish between four-step and two-step RA. Alternatively, the Physical Random Access Channel (PRACH) configurations are different for the two-step and four-step RA procedure, in which case it can be deduced from where the preamble transmission is done if the UE is doing a two-step or four-step procedure.

Figure 12:
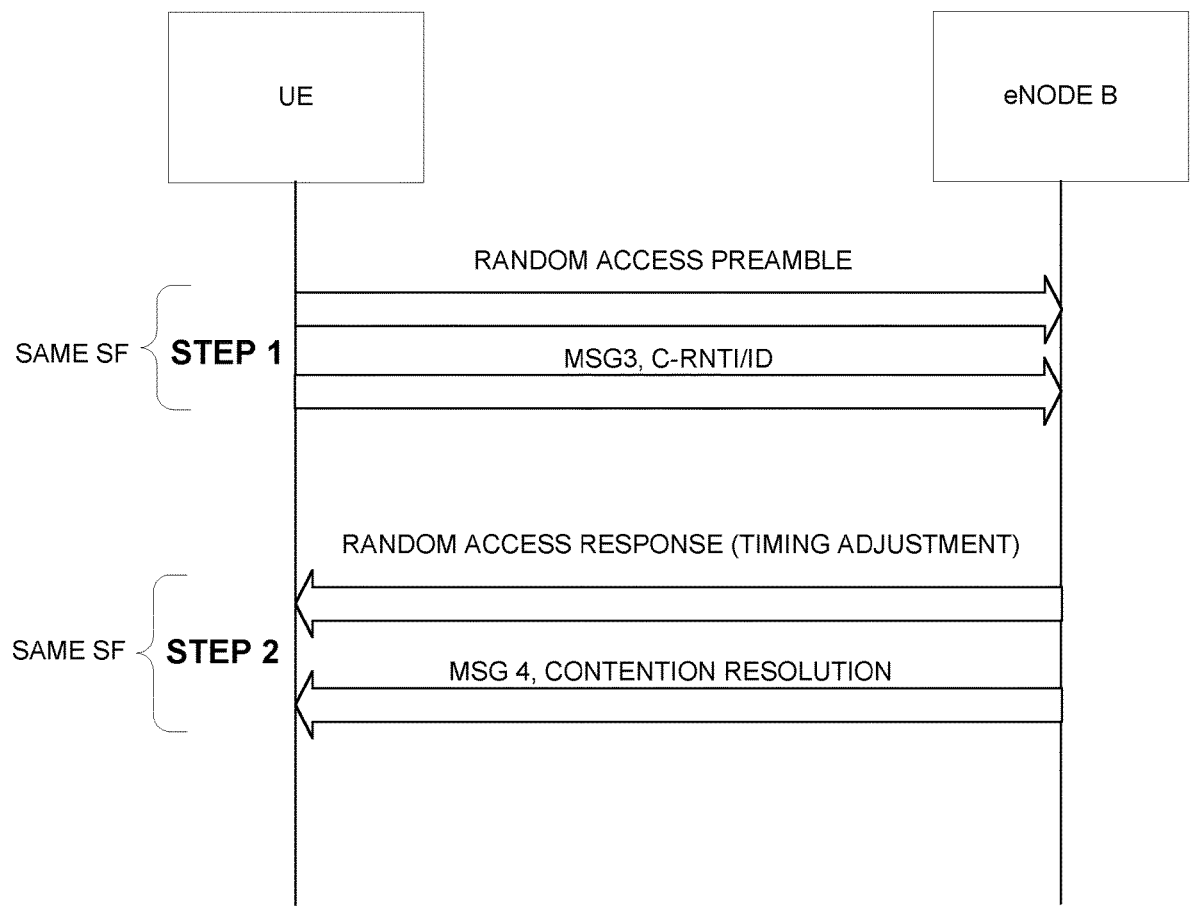
FIG. 12 is a call flow diagram of a 2-step random access procedure according to some embodiments.

The two-step RA gives much shorter latency than the ordinary four-step RA. In the two-step RA, the preamble and a message corresponding to Msg3 in the four-step RA are transmitted in the same slot (or subframe) or in two subsequent slots (or subframes). The Msg 3 is sent on a resource dedicated to the specific preamble. This means that both the preamble and the Msg 3 face contention but contention resolution in this case means that either both preamble and Msg 3 are sent without collision or both collide. The two-step RA procedure is depicted in FIG. 12.

Upon successful reception of the preamble and Msg3, the eNB will respond with a TA (which by assumption should not be needed or just give very minor updates) and a Msg4 for contention resolution.

An issue that may occur if the UE TA is bad (e.g. using TA=0 in a large cell or using an old TA even though the UE has moved) is that only the preamble can be detected by the eNB. Because a transmission with an inaccurate TA value may interfere with transmissions from other UEs in the same cell. Additionally, the preamble signal has higher detection probability than the normal data due to its design pattern. In this case the network (NW) may reply with an ordinary RAR giving the UE an opportunity to transmit an ordinary Msg3 on a scheduled resource. This is a fallback to four-step RA.

As used herein, a PUSCH occasion (PO) for two-step RACH is defined as the time-frequency resource for payload transmission. One or more PUSCH occasion(s) within an msgA PUSCH configuration period are configured. In some embodiments, with separate PUSCH configuration, msgA PUSCH configuration period may or may not be the same as PRACH configuration period. In other embodiments, with PUSCH configuration with relative location, msgA PUSCH configuration period is the PRACH configuration period. Regardless, a PUSCH resource unit (PRU) for two-step RACH is defined as the PUSCH occasion and DMRS port/DMRS sequence used for an msgA payload transmission. In some embodiments, there is support for only one or both of DMRS port/DMRS sequence. The DMRS sequence generation mechanism should follow Rel. 15.

In some embodiments, there is at least support for one-to-one and multiple-to-one mapping between preambles in each RACH occasion (RO) and associated PUSCH resource unit (PRU). There may be a configurable number of preambles (including one or multiple) mapped to one PUSCH resource unit.

Consider now the mapping between PRACH preamble resource and PUSCH resource unit according to some embodiments. PUSCH resource unit (PRU) is the PUSCH occasion and DMRS port/DMRS sequence used for an MsgA payload transmission. For mapping between preambles in each RO and associated PUSCH resource unit, the design may consider factors such as resource utilization efficiency and decoding complexity at gNB.

At least one-to-one and multiple(N)-to-one need to be supported according to some embodiments. For different RA events and different purposes, the payload size of a MsgA may vary in a range from a few bytes to a few hundred bytes. For better spectral efficiency, different mapping rules between preambles in each RO and associated PUSCH resource unit are expected such as: (i) One-to-One Mapping; (ii) Many-to-One Mapping; and/or (iii) One-to-Many Mapping.

Some embodiments herein address challenges that exist if two-step RACH UEs share the same pool of preambles/ROs with four-step RACH UEs. In this case, the resources configured for two-step RACH would be limited. Accordingly, some embodiments herein are applicable in a context where one preamble in each RO maps to multiple PRUs, since the PUSCH resources may be not so limited.

For example, for every preamble in a RO, the associated PRUs are distributed in both frequency domain and/or time domain. If there are multiple PRUs mapped to a preamble, there will be only one part of PRUs which are close to the preamble in time domain so that the gap between a PRU and the preamble is sufficiently short and the UE is able to perform one LBT operation for both the preamble and the PRU. In other words, there may be another part of PRUs which are not sufficiently close to the preamble in time domain. In this case, the gap between a selected PRU from this set of PRUs and the preamble may be larger than 16 us, so the UE has to perform a second LBT operation for the PUSCH payload after transmission of the preamble.

For a two-step RACH based access in unlicensed band, the UE shall aim to perform only one LBT operation for both preamble and PUSCH payload as much as possible. Otherwise, the benefits of two-step RACH are minimized compared to four-step RACH. However, due to the issues described above, it is not always possible to perform one single LBT operation for MsgA, especially when the UE selects a PRU which is not close to the selected preamble in time. The second LBT operation would cause a large delay for the corresponding RACH access. In a cell with high RACH load, there may be only a small portion of RACH accesses that are delay sensitive and therefore are more deserving to choose two-step RA. Random selection of PO/PRU for the payload in MsgA is expected to be supported for two-step RA, which is clearly not efficient from a delay perspective.

Some embodiments here thereby provide mechanisms to select important RA accesses to fully exploit the benefits of two-step RA. Some embodiments herein may configure channel access mechanisms for two-step RA. Some embodiments in this regard aim to avoid the second LBT operation prior to transmission of the payload in MsgA for RAs with high priority levels. In addition, methods on how to provide additional transmission opportunities to overcome potential LBT failures for the payload in MsgA are also proposed.

Certain embodiments may provide one or more of the following technical advantage(s): (i) the random access latency for prioritized two-step RAs can be reduced; (ii) unnecessary transmissions can be minimized; and/or (iii) better satisfaction of service QoS with higher priority levels.

The below embodiments are described in the context of NR unlicensed spectrum (NR-U). The embodiments however are not limited to NR-U scenarios. They are also applicable to other unlicensed operation scenarios such as LTE LAA/eLAA/feLAA/MulteFire. Some embodiments may be also applicable to licensed scenarios.

In a first embodiment, for a two-step RACH based access, for every preamble or RO, there may be multiple POs or PRUs mapped. As soon as the UE selects a preamble or RO after selection of a Synchronization Signal Block (SSB) or a channel state information reference signal (CSI-RS) with measured Reference Signal Received Power (RSRP) above the configured rsrp-Threshold, the UE selects one of PO or PRU from the set of POs/PRUs that are mapped to the preamble or RO for transmission of the PUSCH payload in MsgA. The selection is performed according to at least one of the below conditions, which are examples of the one or more selection criteria discussed with respect to FIG. 1:

1) Select one PO/PRU from the set which has a gap to the preamble/RO in time that is not more than a configured threshold (for example, which may be configured as 16 us) if the triggered RA event is prioritized. A RA is prioritized in case it is triggered for a handover (HO), a Radio Link Failure (RL) RRC re-establishment or Beam Failure Recovery (BFR). A RA is also prioritized in case it is triggered if there is an SR failure or there is no valid PUCCH resource for an SR configuration, which is associated with high priority logical channels. If there are multiple POs/PRUs which meet the condition, the UE randomly selects one of them.

2) Select one PO/PRU from the set that has the gap to the preamble/RO in time which is more than a configured threshold (for example, which may be configured as 16 us or 25 us) if the triggered RA is not prioritized. A RA is not prioritized in case it is not triggered for a HO, a RLF RRC re-establishment or, BFR. A RA is not prioritized in case it is triggered if there is an SR failure or there is no valid PUCCH resource for an SR configuration, which is associated with low priority logical channels. If there are multiple POs/PRUs which meet the condition, the UE randomly selects one of them.

In these embodiments, the UE would then perform just one LBT operation for both a preamble and its subsequent PUSCH payload in MsgA for a two-step RA with high priority. While for a two-step RA with low priority, the UE has to perform at least two LBT operations for transmission of MsgA. Depending on the gap between the preamble and the PO/PRU in time, the UE performs a Category 2 LBT if the gap is not more than 25 us, while performs a Category 4 LBT if the gap is more than 25 us.

Figure 13:
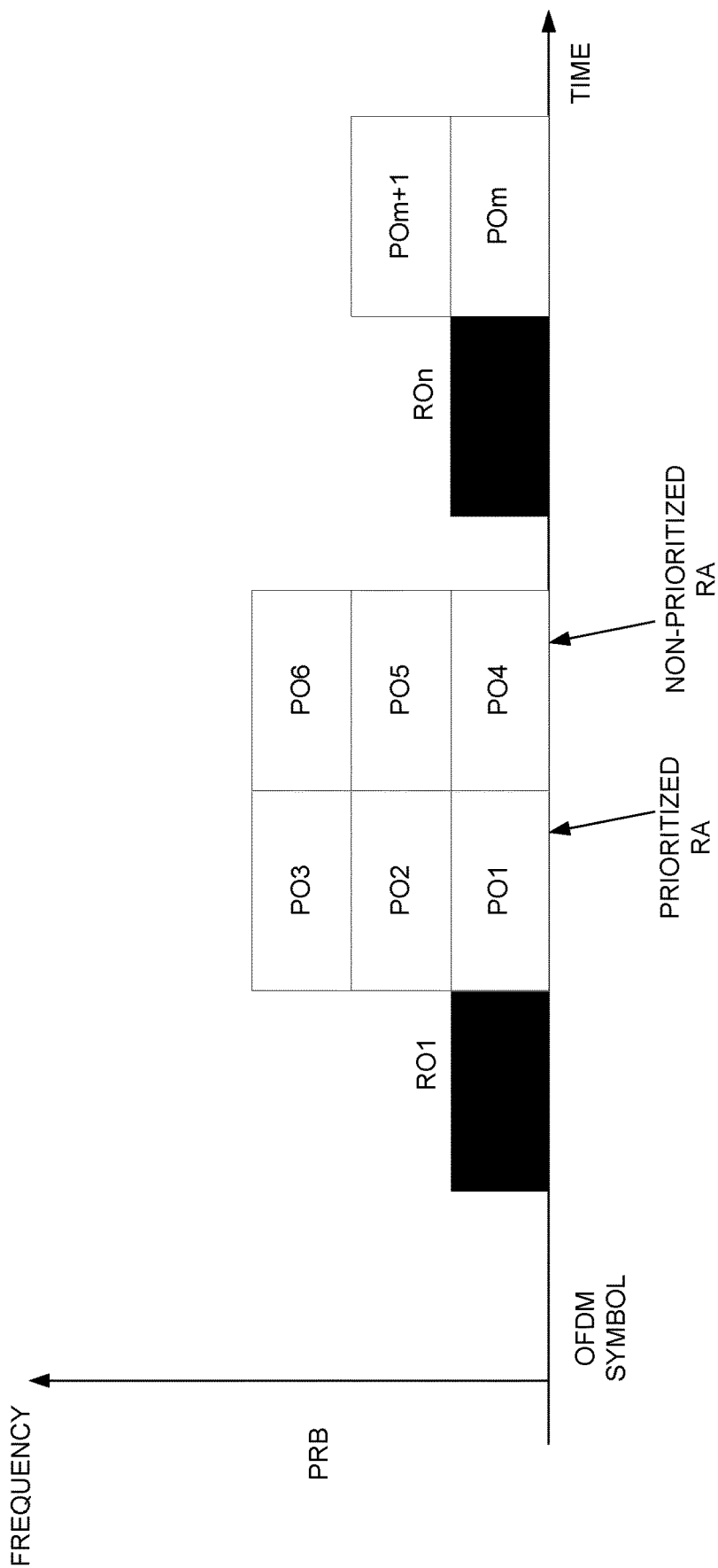
FIG. 13 is a block diagram of random access occasions for random access with different priorities according to some embodiments.

An example of the proposed mechanism is illustrated in FIG. 13, which shows separated POs for RAs with different priorities. In this example, for each RO, different PO/PRUs are allocated for RAs with different priority levels. There may be multiple UEs which are selecting preambles associated in RO1. After transmission of a preamble, UE1 with prioritized RA would select a PO (with the index between 1 and 3). Since the time gap between the selected PO and the RO is sufficiently short, UE1 can skip LBT operation for transmission of PUSCH payload in the selected PO. At the same time, UE2 with non-prioritized RA would then select a PO (with the index between 4-6). In this case, UE2 has to perform a LBT operation prior to transmission of PUSCH payload in the selected PO since the time gap between the selected PO and the RO is over the configured threshold (e.g., 16 us).

Note in the above embodiments that, each logical channel (associated with different logical channel or service priority) can be mapped to one scheduling request (SR) configuration for triggering SR. Each SR configuration contains one or multiple Physical Uplink Control Channel (PUCCH) resources. So, an SR can be transmitted using one PUCCH resource on the PUCCH channel. Whenever an SR is triggered due to new data arrival, the UE first tries to transmit the SR on PUCCH channel using the PUCCH resource. However, if there is no valid PUCCH resource found, the UE then triggers a RA instead.

Note also that, if the high priority threshold is set as 16 us and the low priority threshold is set as 25 us, if the gap between a PO/PRU and the preamble/RO is between 16 us and 25 us, the UE may perform a one-shot category 2 LBT for the payload, e.g., an LBT with fixed duration 25 us.

In a second embodiment, how to select a PO/PRU for the payload in MsgA is connected to a UE capability, i.e., whether or not the UE is capable of performing the same LBT operation for both the preamble and the payload in a MsgA. A new UE capability may be introduced accordingly, e.g., as an example of the one or more selection criteria described with respect to FIG. 1. In this way, a UE supporting this capability would choose a PO/PRU which has a sufficiently small gap in time to the preamble so that the UE just performs the same LBT operation for transmission of a MsgA, while a UE not supporting the capability would choose a PO/PRU which has a larger gap in time to the preamble so that the UE has to perform at least two LBT operations for transmission of a MsgA, i.e., one LBT operation for the preamble, and the second LBT operation for the payload of a MsgA.

Note that the UE capability may concern whether or not to support performing the same LBT operation for both the preamble and the payload in MsgA. The UE capability embodiment may for instance be particularly applicable if a UE only supports specific services, such as a specific machine-type communication (MTC) terminal or a terminal designed for industry automation. In this case, the UE capability may be implicitly indicative of or associated with a certain priority or service. The embodiment may therefore effectively use quicker PO/PRU for high priority RA.

In a third embodiment, for a two-step RACH based access, in order to find the best match between a preamble/RO and a PO/PRU so that the UE may perform just one single LBT operation for transmission of MsgA, the UE may have to search through multiple (e.g., all) SSBs or CSI-RSs. The eventually selected SSB or CSI-RS may not necessarily be the one with strongest measured radio channel quality (e.g., RSRP). As another alternative, the mapping between preambles/ROs and POs/PRUs may be organized/sorted in a way that the UE can search the mapping table/entries using wanted LBT parameters (such as category, channel access priority class, number of LBT attempts etc) as inputs. The UE can find matched entries accordingly. This third embodiment may therefore represent an example of the method in FIG. 3.

In a fourth embodiment, in a cell configured with two-step RA, different groups of PRACH preambles, and/or ROs (both in frequency domain or time domain) are configured to be associated with different channel access parameters for MsgA PUSCH payload. The parameters may include for instance LBT categories, and/or different channel access priority classes (CAPCs). The different groups of PRACH preambles and/or Ros may be even further associated with different RA events/purposes, priority levels (e.g., prioritized RA or non-prioritized RA) etc.

In this way, whenever a UE in the cell has triggered a two-step RA, the UE selects a preamble from the corresponding groups (PRACH preamble, and/or ROs). The UE then knows what is the corresponding LBT category, and/or CAPC for the subsequent PUSCH payload in MsgA.

This fourth embodiment may therefore represent an example of the method in FIG. 4.

In a fifth embodiment, for a two-step RA, in case the UE has to perform a second LBT operation for PUSCH payload after transmission of the preamble, if the LBT operation fails, the UE chooses a different PO/PRU for transmission of PUSCH payload. The UE may apply a different LBT category and/or CAPC for the subsequent LBT operation. This different PO/PRU may be located in a different LBT subband, or BWP or cell compared to previous PO/PRU. This fifth embodiment may therefore represent an example of the method in FIG. 6.

In a sixth embodiment, for a two-step RA, in order to provide more transmission opportunities for the payload in MsgA, the UE may choose multiple POs/PRUs and perform multiple LBT operations in parallel if these POs/PRUs are located in different LBT subbands or BWPs or cells. The UE then selects one PO/PRU that has passed the LBT operation for transmission of the payload in MsgA. This sixth embodiment may therefore represent an example of the method in FIG. 5.

In a seventh embodiment, for any of the above embodiments, the channel occupancy or LBT failure statistics may be considered by a UE when selecting a preamble/RO or a PO/PRU for MsgA, e.g., in case preambles/ROs and/or POs/PRUs are configured on different LBT subbands or BWPs or cells. The UE would then select one preamble/RO and PO/PRU on the LBT subband/BWP/cell with lowest CO or occurrence of LBT failures. This seventh embodiment may therefore represent an example of the method in FIG. 7.

Note that a radio network node (e.g., gNB) may transmit configuration signaling to the UE to configure the UE according to any of the above embodiments, e.g., as described with respect to FIG. 8. For example, the configuration signaling may configure the UE with a mapping used by any of the above embodiments, e.g., a mapping between preambles/ROs and POs/PRUs based on LBT parameters.

Figure 14:
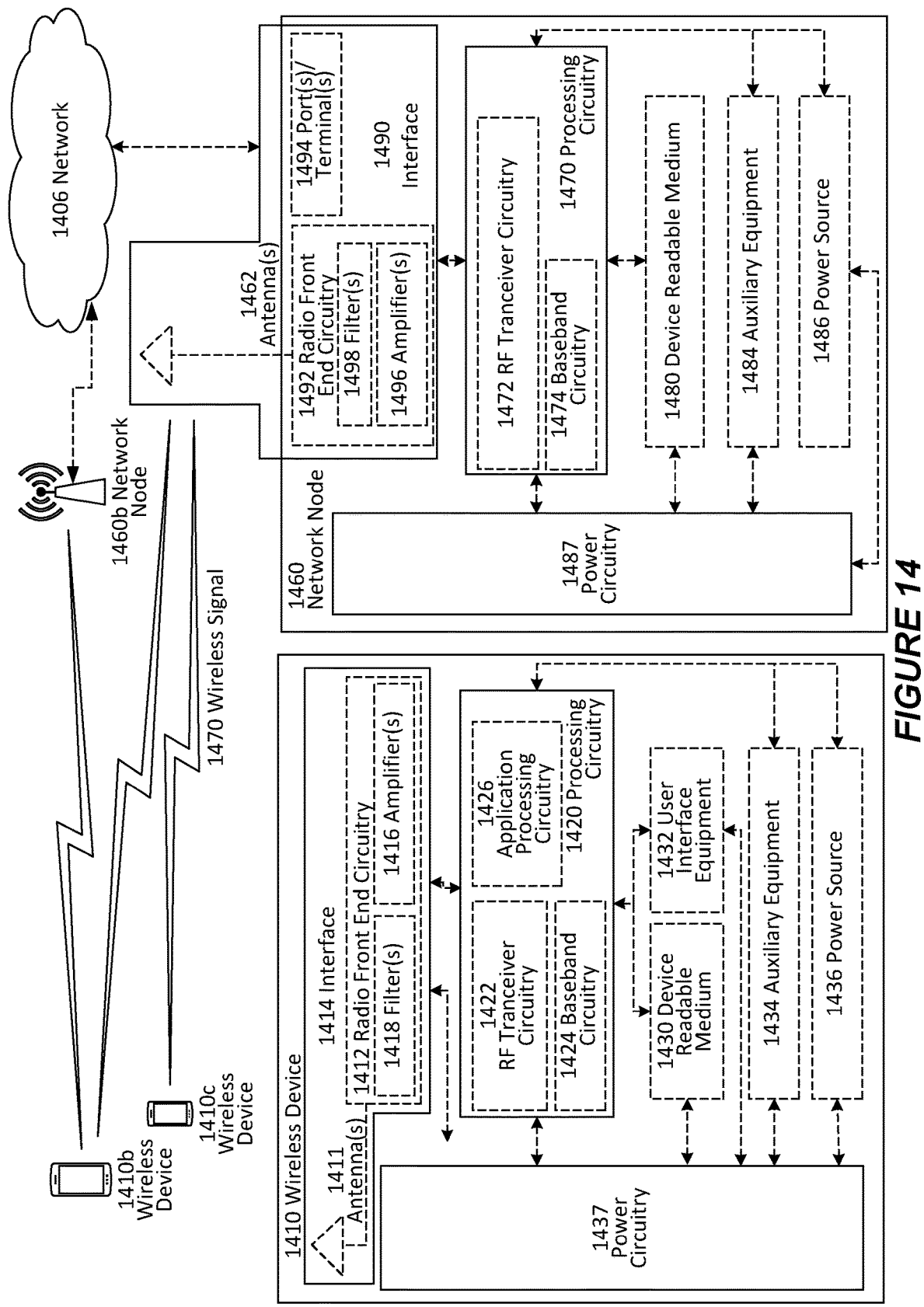
FIG. 14 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 14. For simplicity, the wireless network of FIG. 14 only depicts network 1406, network nodes 1460 and 1460b, and WDs 1410, 1410b, and 1410c. In practice, a wireless network may further include any additional elements suitable to support communication between wireless devices or between a wireless device and another communication device, such as a landline telephone, a service provider, or any other network node or end device. Of the illustrated components, network node 1460 and wireless device (WD) 1410 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1406 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1460 and WD 1410 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MM Es), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 14, network node 1460 includes processing circuitry 1470, device readable medium 1480, interface 1490, auxiliary equipment 1484, power source 1486, power circuitry 1487, and antenna 1462. Although network node 1460 illustrated in the example wireless network of FIG. 14 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1460 are depicted as single boxes located within a larger box, or nested within multiple boxes, in practice, a network node may comprise multiple different physical components that make up a single illustrated component (e.g., device readable medium 1480 may comprise multiple separate hard drives as well as multiple RAM modules).

Similarly, network node 1460 may be composed of multiple physically separate components (e.g., a NodeB component and a RNC component, or a BTS component and a BSC component, etc.), which may each have their own respective components. In certain scenarios in which network node 1460 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1460 may be configured to support multiple radio access technologies (RATs). In such embodiments, some components may be duplicated (e.g., separate device readable medium 1480 for the different RATs) and some components may be reused (e.g., the same antenna 1462 may be shared by the RATs). Network node 1460 may also include multiple sets of the various illustrated components for different wireless technologies integrated into network node 1460, such as, for example, GSM, WCDMA, LTE, NR, WiFi, or Bluetooth wireless technologies. These wireless technologies may be integrated into the same or different chip or set of chips and other components within network node 1460.

Processing circuitry 1470 is configured to perform any determining, calculating, or similar operations (e.g., certain obtaining operations) described herein as being provided by a network node. These operations performed by processing circuitry 1470 may include processing information obtained by processing circuitry 1470 by, for example, converting the obtained information into other information, comparing the obtained information or converted information to information stored in the network node, and/or performing one or more operations based on the obtained information or converted information, and as a result of said processing making a determination.

Processing circuitry 1470 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1460 components, such as device readable medium 1480, network node 1460 functionality. For example, processing circuitry 1470 may execute instructions stored in device readable medium 1480 or in memory within processing circuitry 1470. Such functionality may include providing any of the various wireless features, functions, or benefits discussed herein. In some embodiments, processing circuitry 1470 may include a system on a chip (SOC).

In some embodiments, processing circuitry 1470 may include one or more of radio frequency (RF) transceiver circuitry 1472 and baseband processing circuitry 1474. In some embodiments, radio frequency (RF) transceiver circuitry 1472 and baseband processing circuitry 1474 may be on separate chips (or sets of chips), boards, or units, such as radio units and digital units. In alternative embodiments, part or all of RF transceiver circuitry 1472 and baseband processing circuitry 1474 may be on the same chip or set of chips, boards, or units In certain embodiments, some or all of the functionality described herein as being provided by a network node, base station, eNB or other such network device may be performed by processing circuitry 1470 executing instructions stored on device readable medium 1480 or memory within processing circuitry 1470. In alternative embodiments, some or all of the functionality may be provided by processing circuitry 1470 without executing instructions stored on a separate or discrete device readable medium, such as in a hard-wired manner. In any of those embodiments, whether executing instructions stored on a device readable storage medium or not, processing circuitry 1470 can be configured to perform the described functionality. The benefits provided by such functionality are not limited to processing circuitry 1470 alone or to other components of network node 1460, but are enjoyed by network node 1460 as a whole, and/or by end users and the wireless network generally.

Device readable medium 1480 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1470. Device readable medium 1480 may store any suitable instructions, data or information, including a computer program, software, an application including one or more of logic, rules, code, tables, etc. and/or other instructions capable of being executed by processing circuitry 1470 and, utilized by network node 1460. Device readable medium 1480 may be used to store any calculations made by processing circuitry 1470 and/or any data received via interface 1490. In some embodiments, processing circuitry 1470 and device readable medium 1480 may be considered to be integrated.

Interface 1490 is used in the wired or wireless communication of signalling and/or data between network node 1460, network 1406, and/or WDs 1410. As illustrated, interface 1490 comprises port(s)/terminal(s) 1494 to send and receive data, for example to and from network 1406 over a wired connection. Interface 1490 also includes radio front end circuitry 1492 that may be coupled to, or in certain embodiments a part of, antenna 1462. Radio front end circuitry 1492 comprises filters 1498 and amplifiers 1496. Radio front end circuitry 1492 may be connected to antenna 1462 and processing circuitry 1470. Radio front end circuitry may be configured to condition signals communicated between antenna 1462 and processing circuitry 1470. Radio front end circuitry 1492 may receive digital data that is to be sent out to other network nodes or WDs via a wireless connection. Radio front end circuitry 1492 may convert the digital data into a radio signal having the appropriate channel and bandwidth parameters using a combination of filters 1498 and/or amplifiers 1496. The radio signal may then be transmitted via antenna 1462. Similarly, when receiving data, antenna 1462 may collect radio signals which are then converted into digital data by radio front end circuitry 1492. The digital data may be passed to processing circuitry 1470. In other embodiments, the interface may comprise different components and/or different combinations of components.

In certain alternative embodiments, network node 1460 may not include separate radio front end circuitry 1492, instead, processing circuitry 1470 may comprise radio front end circuitry and may be connected to antenna 1462 without separate radio front end circuitry 1492. Similarly, in some embodiments, all or some of RF transceiver circuitry 1472 may be considered a part of interface 1490. In still other embodiments, interface 1490 may include one or more ports or terminals 1494, radio front end circuitry 1492, and RF transceiver circuitry 1472, as part of a radio unit (not shown), and interface 1490 may communicate with baseband processing circuitry 1474, which is part of a digital unit (not shown).

Antenna 1462 may include one or more antennas, or antenna arrays, configured to send and/or receive wireless signals. Antenna 1462 may be coupled to radio front end circuitry 1490 and may be any type of antenna capable of transmitting and receiving data and/or signals wirelessly. In some embodiments, antenna 1462 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1462 may be separate from network node 1460 and may be connectable to network node 1460 through an interface or port.

Antenna 1462, interface 1490, and/or processing circuitry 1470 may be configured to perform any receiving operations and/or certain obtaining operations described herein as being performed by a network node. Any information, data and/or signals may be received from a wireless device, another network node and/or any other network equipment. Similarly, antenna 1462, interface 1490, and/or processing circuitry 1470 may be configured to perform any transmitting operations described herein as being performed by a network node. Any information, data and/or signals may be transmitted to a wireless device, another network node and/or any other network equipment.

Power circuitry 1487 may comprise, or be coupled to, power management circuitry and is configured to supply the components of network node 1460 with power for performing the functionality described herein. Power circuitry 1487 may receive power from power source 1486. Power source 1486 and/or power circuitry 1487 may be configured to provide power to the various components of network node 1460 in a form suitable for the respective components (e.g., at a voltage and current level needed for each respective component). Power source 1486 may either be included in, or external to, power circuitry 1487 and/or network node 1460. For example, network node 1460 may be connectable to an external power source (e.g., an electricity outlet) via an input circuitry or interface such as an electrical cable, whereby the external power source supplies power to power circuitry 1487. As a further example, power source 1486 may comprise a source of power in the form of a battery or battery pack which is connected to, or integrated in, power circuitry 1487. The battery may provide backup power should the external power source fail. Other types of power sources, such as photovoltaic devices, may also be used.

Alternative embodiments of network node 1460 may include additional components beyond those shown in FIG. 14 that may be responsible for providing certain aspects of the network node's functionality, including any of the functionality described herein and/or any functionality necessary to support the subject matter described herein. For example, network node 1460 may include user interface equipment to allow input of information into network node 1460 and to allow output of information from network node 1460. This may allow a user to perform diagnostic, maintenance, repair, and other administrative functions for network node 1460.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1410 includes antenna 1411, interface 1414, processing circuitry 1420, device readable medium 1430, user interface equipment 1432, auxiliary equipment 1434, power source 1436 and power circuitry 1437. WD 1410 may include multiple sets of one or more of the illustrated components for different wireless technologies supported by WD 1410, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1410.

Antenna 1411 may include one or more antennas or antenna arrays, configured to send and/or receive wireless signals, and is connected to interface 1414. In certain alternative embodiments, antenna 1411 may be separate from WD 1410 and be connectable to WD 1410 through an interface or port. Antenna 1411, interface 1414, and/or processing circuitry 1420 may be configured to perform any receiving or transmitting operations described herein as being performed by a WD. Any information, data and/or signals may be received from a network node and/or another WD. In some embodiments, radio front end circuitry and/or antenna 1411 may be considered an interface.

As illustrated, interface 1414 comprises radio front end circuitry 1412 and antenna 1411. Radio front end circuitry 1412 comprise one or more filters 1418 and amplifiers 1416. Radio front end circuitry 1414 is connected to antenna 1411 and processing circuitry 1420, and is configured to condition signals communicated between antenna 1411 and processing circuitry 1420. Radio front end circuitry 1412 may be coupled to or a part of antenna 1411. In some embodiments, WD 1410 may not include separate radio front end circuitry 1412; rather, processing circuitry 1420 may comprise radio front end circuitry and may be connected to antenna 1411. Similarly, in some embodiments, some or all of RF transceiver circuitry 1422 may be considered a part of interface 1414. Radio front end circuitry 1412 may receive digital data that is to be sent out to other network nodes or WDs via a wireless connection. Radio front end circuitry 1412 may convert the digital data into a radio signal having the appropriate channel and bandwidth parameters using a combination of filters 1418 and/or amplifiers 1416. The radio signal may then be transmitted via antenna 1411. Similarly, when receiving data, antenna 1411 may collect radio signals which are then converted into digital data by radio front end circuitry 1412. The digital data may be passed to processing circuitry 1420. In other embodiments, the interface may comprise different components and/or different combinations of components.

Processing circuitry 1420 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1410 components, such as device readable medium 1430, WD 1410 functionality. Such functionality may include providing any of the various wireless features or benefits discussed herein. For example, processing circuitry 1420 may execute instructions stored in device readable medium 1430 or in memory within processing circuitry 1420 to provide the functionality disclosed herein.

As illustrated, processing circuitry 1420 includes one or more of RF transceiver circuitry 1422, baseband processing circuitry 1424, and application processing circuitry 1426. In other embodiments, the processing circuitry may comprise different components and/or different combinations of components. In certain embodiments processing circuitry 1420 of WD 1410 may comprise a SOC. In some embodiments, RF transceiver circuitry 1422, baseband processing circuitry 1424, and application processing circuitry 1426 may be on separate chips or sets of chips. In alternative embodiments, part or all of baseband processing circuitry 1424 and application processing circuitry 1426 may be combined into one chip or set of chips, and RF transceiver circuitry 1422 may be on a separate chip or set of chips. In still alternative embodiments, part or all of RF transceiver circuitry 1422 and baseband processing circuitry 1424 may be on the same chip or set of chips, and application processing circuitry 1426 may be on a separate chip or set of chips. In yet other alternative embodiments, part or all of RF transceiver circuitry 1422, baseband processing circuitry 1424, and application processing circuitry 1426 may be combined in the same chip or set of chips. In some embodiments, RF transceiver circuitry 1422 may be a part of interface 1414. RF transceiver circuitry 1422 may condition RF signals for processing circuitry 1420.

In certain embodiments, some or all of the functionality described herein as being performed by a WD may be provided by processing circuitry 1420 executing instructions stored on device readable medium 1430, which in certain embodiments may be a computer-readable storage medium. In alternative embodiments, some or all of the functionality may be provided by processing circuitry 1420 without executing instructions stored on a separate or discrete device readable storage medium, such as in a hard-wired manner. In any of those particular embodiments, whether executing instructions stored on a device readable storage medium or not, processing circuitry 1420 can be configured to perform the described functionality. The benefits provided by such functionality are not limited to processing circuitry 1420 alone or to other components of WD 1410, but are enjoyed by WD 1410 as a whole, and/or by end users and the wireless network generally.

Processing circuitry 1420 may be configured to perform any determining, calculating, or similar operations (e.g., certain obtaining operations) described herein as being performed by a WD. These operations, as performed by processing circuitry 1420, may include processing information obtained by processing circuitry 1420 by, for example, converting the obtained information into other information, comparing the obtained information or converted information to information stored by WD 1410, and/or performing one or more operations based on the obtained information or converted information, and as a result of said processing making a determination.

Device readable medium 1430 may be operable to store a computer program, software, an application including one or more of logic, rules, code, tables, etc. and/or other instructions capable of being executed by processing circuitry 1420. Device readable medium 1430 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1420. In some embodiments, processing circuitry 1420 and device readable medium 1430 may be considered to be integrated.

User interface equipment 1432 may provide components that allow for a human user to interact with WD 1410. Such interaction may be of many forms, such as visual, audial, tactile, etc. User interface equipment 1432 may be operable to produce output to the user and to allow the user to provide input to WD 1410. The type of interaction may vary depending on the type of user interface equipment 1432 installed in WD 1410. For example, if WD 1410 is a smart phone, the interaction may be via a touch screen; if WD 1410 is a smart meter, the interaction may be through a screen that provides usage (e.g., the number of gallons used) or a speaker that provides an audible alert (e.g., if smoke is detected). User interface equipment 1432 may include input interfaces, devices and circuits, and output interfaces, devices and circuits. User interface equipment 1432 is configured to allow input of information into WD 1410, and is connected to processing circuitry 1420 to allow processing circuitry 1420 to process the input information. User interface equipment 1432 may include, for example, a microphone, a proximity or other sensor, keys/buttons, a touch display, one or more cameras, a USB port, or other input circuitry. User interface equipment 1432 is also configured to allow output of information from WD 1410, and to allow processing circuitry 1420 to output information from WD 1410. User interface equipment 1432 may include, for example, a speaker, a display, vibrating circuitry, a USB port, a headphone interface, or other output circuitry. Using one or more input and output interfaces, devices, and circuits, of user interface equipment 1432, WD 1410 may communicate with end users and/or the wireless network, and allow them to benefit from the functionality described herein.

Auxiliary equipment 1434 is operable to provide more specific functionality which may not be generally performed by WDs. This may comprise specialized sensors for doing measurements for various purposes, interfaces for additional types of communication such as wired communications etc. The inclusion and type of components of auxiliary equipment 1434 may vary depending on the embodiment and/or scenario.

Power source 1436 may, in some embodiments, be in the form of a battery or battery pack. Other types of power sources, such as an external power source (e.g., an electricity outlet), photovoltaic devices or power cells, may also be used. WD 1410 may further comprise power circuitry 1437 for delivering power from power source 1436 to the various parts of WD 1410 which need power from power source 1436 to carry out any functionality described or indicated herein. Power circuitry 1437 may in certain embodiments comprise power management circuitry. Power circuitry 1437 may additionally or alternatively be operable to receive power from an external power source; in which case WD 1410 may be connectable to the external power source (such as an electricity outlet) via input circuitry or an interface such as an electrical power cable. Power circuitry 1437 may also in certain embodiments be operable to deliver power from an external power source to power source 1436. This may be, for example, for the charging of power source 1436. Power circuitry 1437 may perform any formatting, converting, or other modification to the power from power source 1436 to make the power suitable for the respective components of WD 1410 to which power is supplied.

Figure 15:
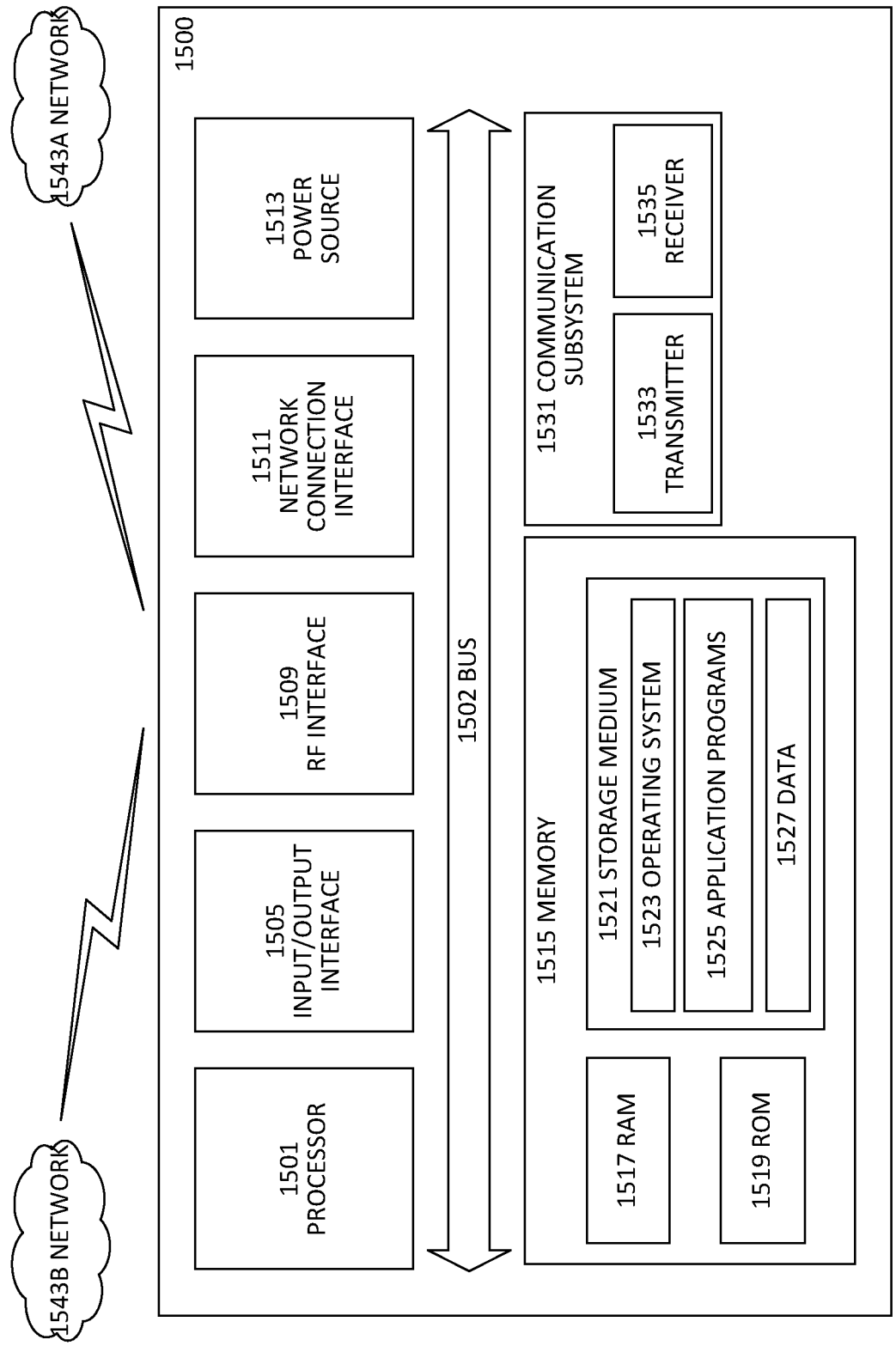
FIG. 15 is a block diagram of a user equipment according to some embodiments.

FIG. 15 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 15200 may be any UE identified by the $3^{rd}$ Generation Partnership Project (3GPP), including a NB-IoT UE, a machine type communication (MTC) UE, and/or an enhanced MTC (eMTC) UE. UE 1500, as illustrated in FIG. 15, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 15 is a UE, the components discussed herein are equally applicable to a WD, and vice-versa.

In FIG. 15, UE 1500 includes processing circuitry 1501 that is operatively coupled to input/output interface 1505, radio frequency (RF) interface 1509, network connection interface 1511, memory 1515 including random access memory (RAM) 1517, read-only memory (ROM) 1519, and storage medium 1521 or the like, communication subsystem 1531, power source 1533, and/or any other component, or any combination thereof. Storage medium 1521 includes operating system 1523, application program 1525, and data 1527. In other embodiments, storage medium 1521 may include other similar types of information. Certain UEs may utilize all of the components shown in FIG. 15, or only a subset of the components. The level of integration between the components may vary from one UE to another UE. Further, certain UEs may contain multiple instances of a component, such as multiple processors, memories, transceivers, transmitters, receivers, etc.

In FIG. 15, processing circuitry 1501 may be configured to process computer instructions and data. Processing circuitry 1501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1501 may include two central processing units (CPUs). Data may be information in a form suitable for use by a computer.

In the depicted embodiment, input/output interface 1505 may be configured to provide a communication interface to an input device, output device, or input and output device. UE 1500 may be configured to use an output device via input/output interface 1505. An output device may use the same type of interface port as an input device. For example, a USB port may be used to provide input to and output from UE 1500. The output device may be a speaker, a sound card, a video card, a display, a monitor, a printer, an actuator, an emitter, a smartcard, another output device, or any combination thereof. UE 1500 may be configured to use an input device via input/output interface 1505 to allow a user to capture information into UE 1500. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 15, RF interface 1509 may be configured to provide a communication interface to RF components such as a transmitter, a receiver, and an antenna. Network connection interface 1511 may be configured to provide a communication interface to network 1543a. Network 1543a may encompass wired and/or wireless networks such as a local-area network (LAN), a wide-area network (WAN), a computer network, a wireless network, a telecommunications network, another like network or any combination thereof. For example, network 1543a may comprise a Wi-Fi network. Network connection interface 1511 may be configured to include a receiver and a transmitter interface used to communicate with one or more other devices over a communication network according to one or more communication protocols, such as Ethernet, TCP/IP, SONET, ATM, or the like. Network connection interface 1511 may implement receiver and transmitter functionality appropriate to the communication network links (e.g., optical, electrical, and the like). The transmitter and receiver functions may share circuit components, software or firmware, or alternatively may be implemented separately.

RAM 1517 may be configured to interface via bus 1502 to processing circuitry 1501 to provide storage or caching of data or computer instructions during the execution of software programs such as the operating system, application programs, and device drivers. ROM 1519 may be configured to provide computer instructions or data to processing circuitry 1501. For example, ROM 1519 may be configured to store invariant low-level system code or data for basic system functions such as basic input and output (I/O), startup, or reception of keystrokes from a keyboard that are stored in a non-volatile memory. Storage medium 1521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1521 may be configured to include operating system 1523, application program 1525 such as a web browser application, a widget or gadget engine or another application, and data file 1527. Storage medium 1521 may store, for use by UE 1500, any of a variety of various operating systems or combinations of operating systems.

Storage medium 1521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1521 may allow UE 1500 to access computer-executable instructions, application programs or the like, stored on transitory or non-transitory memory media, to off-load data, or to upload data. An article of manufacture, such as one utilizing a communication system may be tangibly embodied in storage medium 1521, which may comprise a device readable medium.

In FIG. 15, processing circuitry 1501 may be configured to communicate with network 1543b using communication subsystem 1531. Network 1543a and network 1543b may be the same network or networks or different network or networks. Communication subsystem 1531 may be configured to include one or more transceivers used to communicate with network 1543b. For example, communication subsystem 1531 may be configured to include one or more transceivers used to communicate with one or more remote transceivers of another device capable of wireless communication such as another WD, UE, or base station of a radio access network (RAN) according to one or more communication protocols, such as IEEE 802.15, CDMA, WCDMA, GSM, LTE, UTRAN, WiMax, or the like. Each transceiver may include transmitter 1533 and/or receiver 1535 to implement transmitter or receiver functionality, respectively, appropriate to the RAN links (e.g., frequency allocations and the like). Further, transmitter 1533 and receiver 1535 of each transceiver may share circuit components, software or firmware, or alternatively may be implemented separately.

In the illustrated embodiment, the communication functions of communication subsystem 1531 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1531 may include cellular communication, Wi-Fi communication, Bluetooth communication, and GPS communication. Network 1543b may encompass wired and/or wireless networks such as a local-area network (LAN), a wide-area network (WAN), a computer network, a wireless network, a telecommunications network, another like network or any combination thereof. For example, network 1543b may be a cellular network, a Wi-Fi network, and/or a near-field network. Power source 1513 may be configured to provide alternating current (AC) or direct current (DC) power to components of UE 1500.

The features, benefits and/or functions described herein may be implemented in one of the components of UE 1500 or partitioned across multiple components of UE 1500. Further, the features, benefits, and/or functions described herein may be implemented in any combination of hardware, software or firmware. In one example, communication subsystem 1531 may be configured to include any of the components described herein. Further, processing circuitry 1501 may be configured to communicate with any of such components over bus 1502. In another example, any of such components may be represented by program instructions stored in memory that when executed by processing circuitry 1501 perform the corresponding functions described herein. In another example, the functionality of any of such components may be partitioned between processing circuitry 1501 and communication subsystem 1531. In another example, the non-computationally intensive functions of any of such components may be implemented in software or firmware and the computationally intensive functions may be implemented in hardware.

Figure 16:
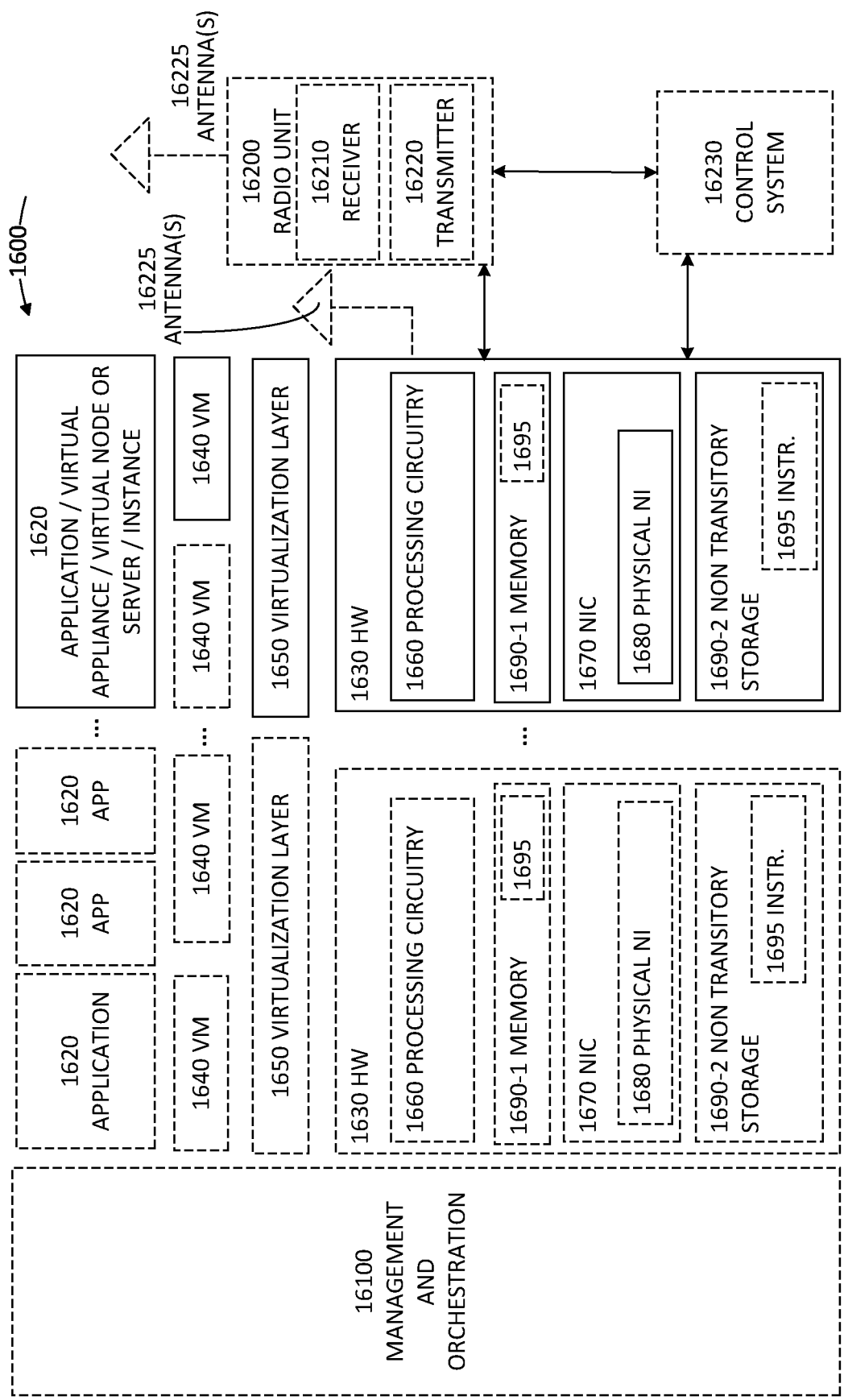
FIG. 16 is a block diagram of a virtualization environment according to some embodiments.

FIG. 16 is a schematic block diagram illustrating a virtualization environment 1600 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1600 hosted by one or more of hardware nodes 1630. Further, in embodiments in which the virtual node is not a radio access node or does not require radio connectivity (e.g., a core network node), then the network node may be entirely virtualized.

The functions may be implemented by one or more applications 1620 (which may alternatively be called software instances, virtual appliances, network functions, virtual nodes, virtual network functions, etc.) operative to implement some of the features, functions, and/or benefits of some of the embodiments disclosed herein. Applications 1620 are run in virtualization environment 1600 which provides hardware 1630 comprising processing circuitry 1660 and memory 1690. Memory 1690 contains instructions 1695 executable by processing circuitry 1660 whereby application 1620 is operative to provide one or more of the features, benefits, and/or functions disclosed herein.

Virtualization environment 1600, comprises general-purpose or special-purpose network hardware devices 1630 comprising a set of one or more processors or processing circuitry 1660, which may be commercial off-the-shelf (COTS) processors, dedicated Application Specific Integrated Circuits (ASICs), or any other type of processing circuitry including digital or analog hardware components or special purpose processors. Each hardware device may comprise memory 1690-1 which may be non-persistent memory for temporarily storing instructions 1695 or software executed by processing circuitry 1660. Each hardware device may comprise one or more network interface controllers (NICs) 1670, also known as network interface cards, which include physical network interface 1680. Each hardware device may also include non-transitory, persistent, machine-readable storage media 1690-2 having stored therein software 1695 and/or instructions executable by processing circuitry 1660. Software 1695 may include any type of software including software for instantiating one or more virtualization layers 1650 (also referred to as hypervisors), software to execute virtual machines 1640 as well as software allowing it to execute functions, features and/or benefits described in relation with some embodiments described herein.

Virtual machines 1640, comprise virtual processing, virtual memory, virtual networking or interface and virtual storage, and may be run by a corresponding virtualization layer 1650 or hypervisor. Different embodiments of the instance of virtual appliance 1620 may be implemented on one or more of virtual machines 1640, and the implementations may be made in different ways.

During operation, processing circuitry 1660 executes software 1695 to instantiate the hypervisor or virtualization layer 1650, which may sometimes be referred to as a virtual machine monitor (VMM). Virtualization layer 1650 may present a virtual operating platform that appears like networking hardware to virtual machine 1640.

As shown in FIG. 16, hardware 1630 may be a standalone network node with generic or specific components. Hardware 1630 may comprise antenna 16225 and may implement some functions via virtualization. Alternatively, hardware 1630 may be part of a larger cluster of hardware (e.g. such as in a data center or customer premise equipment (CPE)) where many hardware nodes work together and are managed via management and orchestration (MANO) 16100, which, among others, oversees lifecycle management of applications 1620.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1640 may be a software implementation of a physical machine that runs programs as if they were executing on a physical, non-virtualized machine. Each of virtual machines 1640, and that part of hardware 1630 that executes that virtual machine, be it hardware dedicated to that virtual machine and/or hardware shared by that virtual machine with others of the virtual machines 1640, forms a separate virtual network elements (VNE).

Still in the context of NFV, Virtual Network Function (VNF) is responsible for handling specific network functions that run in one or more virtual machines 1640 on top of hardware networking infrastructure 1630 and corresponds to application 1620 in FIG. 16.

In some embodiments, one or more radio units 16200 that each include one or more transmitters 16220 and one or more receivers 16210 may be coupled to one or more antennas 16225. Radio units 16200 may communicate directly with hardware nodes 1630 via one or more appropriate network interfaces and may be used in combination with the virtual components to provide a virtual node with radio capabilities, such as a radio access node or a base station.

In some embodiments, some signalling can be effected with the use of control system 16230 which may alternatively be used for communication between the hardware nodes 1630 and radio units 16200.

Figure 17:
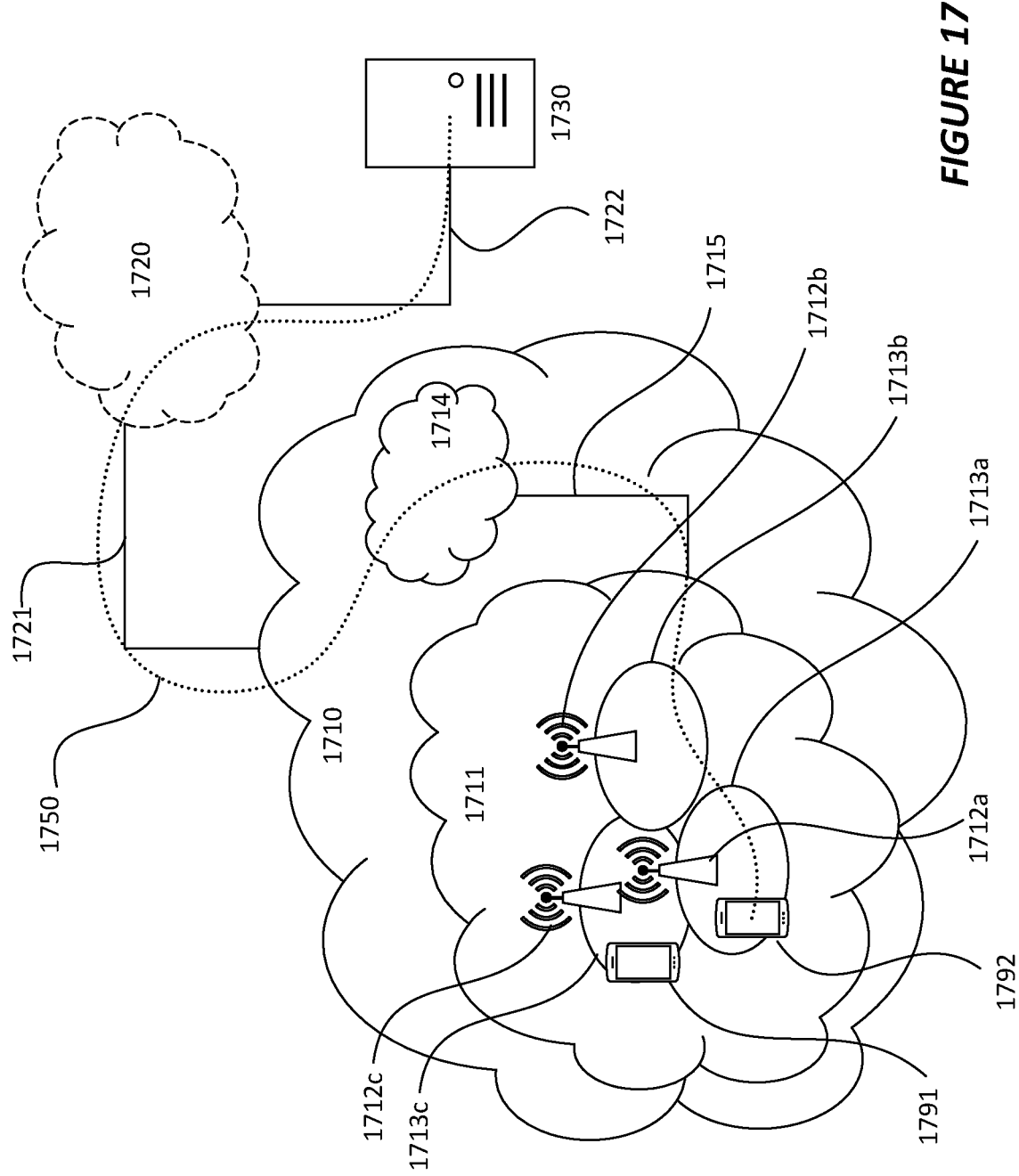
FIG. 17 is a block diagram of a communication network with a host computer according to some embodiments.

FIG. 17 illustrates a telecommunication network connected via an intermediate network to a host computer in accordance with some embodiments. In particular, with reference to FIG. 17, in accordance with an embodiment, a communication system includes telecommunication network 1710, such as a 3GPP-type cellular network, which comprises access network 1711, such as a radio access network, and core network 1714. Access network 1711 comprises a plurality of base stations 1712*a*, 1712*b*, 1712*c*, such as NBs, eNBs, gNBs or other types of wireless access points, each defining a corresponding coverage area 1713*a*, 1713*b*, 1713*c*. Each base station 1712*a*, 1712*b*, 1712*c* is connectable to core network 1714 over a wired or wireless connection 1715. A first UE 1791 located in coverage area 1713*c* is configured to wirelessly connect to, or be paged by, the corresponding base station 1712*c*. A second UE 1792 in coverage area 1713*a* is wirelessly connectable to the corresponding base station 1712*a*. While a plurality of UEs 1791, 1792 are illustrated in this example, the disclosed embodiments are equally applicable to a situation where a sole UE is in the coverage area or where a sole UE is connecting to the corresponding base station 1712.

Telecommunication network 1710 is itself connected to host computer 1730, which may be embodied in the hardware and/or software of a standalone server, a cloud-implemented server, a distributed server or as processing resources in a server farm. Host computer 1730 may be under the ownership or control of a service provider, or may be operated by the service provider or on behalf of the service provider. Connections 1721 and 1722 between telecommunication network 1710 and host computer 1730 may extend directly from core network 1714 to host computer 1730 or may go via an optional intermediate network 1720. Intermediate network 1720 may be one of, or a combination of more than one of, a public, private or hosted network; intermediate network 1720, if any, may be a backbone network or the Internet; in particular, intermediate network 1720 may comprise two or more sub-networks (not shown).

The communication system of FIG. 17 as a whole enables connectivity between the connected UEs 1791, 1792 and host computer 1730. The connectivity may be described as an over-the-top (OTT) connection 1750. Host computer 1730 and the connected UEs 1791, 1792 are configured to communicate data and/or signaling via OTT connection 1750, using access network 1711, core network 1714, any intermediate network 1720 and possible further infrastructure (not shown) as intermediaries. OTT connection 1750 may be transparent in the sense that the participating communication devices through which OTT connection 1750 passes are unaware of routing of uplink and downlink communications. For example, base station 1712 may not or need not be informed about the past routing of an incoming downlink communication with data originating from host computer 1730 to be forwarded (e.g., handed over) to a connected UE 1791. Similarly, base station 1712 need not be aware of the future routing of an outgoing uplink communication originating from the UE 1791 towards the host computer 1730.

Figure 18:
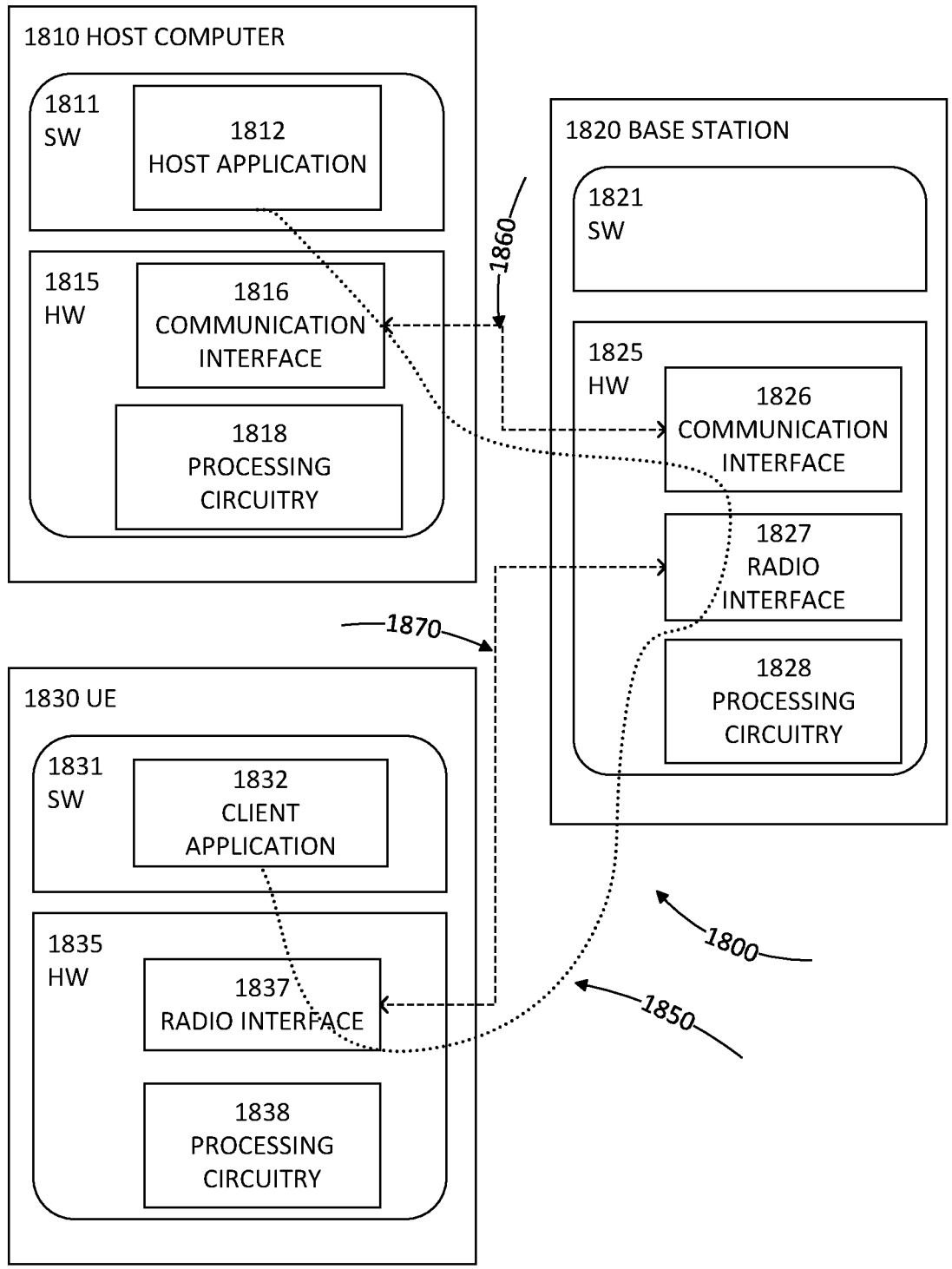
FIG. 18 is a block diagram of a host computer according to some embodiments.

Example implementations, in accordance with an embodiment, of the UE, base station and host computer discussed in the preceding paragraphs will now be described with reference to FIG. 18. FIG. 18 illustrates host computer communicating via a base station with a user equipment over a partially wireless connection in accordance with some embodiments In communication system 1800, host computer 1810 comprises hardware 1815 including communication interface 1816 configured to set up and maintain a wired or wireless connection with an interface of a different communication device of communication system 1800. Host computer 1810 further comprises processing circuitry 1818, which may have storage and/or processing capabilities. In particular, processing circuitry 1818 may comprise one or more programmable processors, application-specific integrated circuits, field programmable gate arrays or combinations of these (not shown) adapted to execute instructions. Host computer 1810 further comprises software 1811, which is stored in or accessible by host computer 1810 and executable by processing circuitry 1818. Software 1811 includes host application 1812. Host application 1812 may be operable to provide a service to a remote user, such as UE 1830 connecting via OTT connection 1850 terminating at UE 1830 and host computer 1810. In providing the service to the remote user, host application 1812 may provide user data which is transmitted using OTT connection 1850.

Communication system 1800 further includes base station 1820 provided in a telecommunication system and comprising hardware 1825 enabling it to communicate with host computer 1810 and with UE 1830. Hardware 1825 may include communication interface 1826 for setting up and maintaining a wired or wireless connection with an interface of a different communication device of communication system 1800, as well as radio interface 1827 for setting up and maintaining at least wireless connection 1870 with UE 1830 located in a coverage area (not shown in FIG. 18) served by base station 1820. Communication interface 1826 may be configured to facilitate connection 1860 to host computer 1810. Connection 1860 may be direct or it may pass through a core network (not shown in FIG. 18) of the telecommunication system and/or through one or more intermediate networks outside the telecommunication system. In the embodiment shown, hardware 1825 of base station 1820 further includes processing circuitry 1828, which may comprise one or more programmable processors, application-specific integrated circuits, field programmable gate arrays or combinations of these (not shown) adapted to execute instructions. Base station 1820 further has software 1821 stored internally or accessible via an external connection.

Communication system 1800 further includes UE 1830 already referred to. Its hardware 1835 may include radio interface 1837 configured to set up and maintain wireless connection 1870 with a base station serving a coverage area in which UE 1830 is currently located. Hardware 1835 of UE 1830 further includes processing circuitry 1838, which may comprise one or more programmable processors, application-specific integrated circuits, field programmable gate arrays or combinations of these (not shown) adapted to execute instructions. UE 1830 further comprises software 1831, which is stored in or accessible by UE 1830 and executable by processing circuitry 1838. Software 1831 includes client application 1832. Client application 1832 may be operable to provide a service to a human or non-human user via UE 1830, with the support of host computer 1810. In host computer 1810, an executing host application 1812 may communicate with the executing client application 1832 via OTT connection 1850 terminating at UE 1830 and host computer 1810. In providing the service to the user, client application 1832 may receive request data from host application 1812 and provide user data in response to the request data. OTT connection 1850 may transfer both the request data and the user data. Client application 1832 may interact with the user to generate the user data that it provides.

It is noted that host computer 1810, base station 1820 and UE 1830 illustrated in FIG. 18 may be similar or identical to host computer 1730, one of base stations 1712a, 1712b, 1712c and one of U Es 1791, 1792 of FIG. 17, respectively. This is to say, the inner workings of these entities may be as shown in FIG. 18 and independently, the surrounding network topology may be that of FIG. 17.

In FIG. 18, OTT connection 1850 has been drawn abstractly to illustrate the communication between host computer 1810 and UE 1830 via base station 1820, without explicit reference to any intermediary devices and the precise routing of messages via these devices. Network infrastructure may determine the routing, which it may be configured to hide from UE 1830 or from the service provider operating host computer 1810, or both. While OTT connection 1850 is active, the network infrastructure may further take decisions by which it dynamically changes the routing (e.g., on the basis of load balancing consideration or reconfiguration of the network).

Wireless connection 1870 between UE 1830 and base station 1820 is in accordance with the teachings of the embodiments described throughout this disclosure. One or more of the various embodiments improve the performance of OTT services provided to UE 1830 using OTT connection 1850, in which wireless connection 1870 forms the last segment.

A measurement procedure may be provided for the purpose of monitoring data rate, latency and other factors on which the one or more embodiments improve. There may further be an optional network functionality for reconfiguring OTT connection 1850 between host computer 1810 and UE 1830, in response to variations in the measurement results. The measurement procedure and/or the network functionality for reconfiguring OTT connection 1850 may be implemented in software 1811 and hardware 1815 of host computer 1810 or in software 1831 and hardware 1835 of UE 1830, or both. In embodiments, sensors (not shown) may be deployed in or in association with communication devices through which OTT connection 1850 passes; the sensors may participate in the measurement procedure by supplying values of the monitored quantities exemplified above, or supplying values of other physical quantities from which software 1811, 1831 may compute or estimate the monitored quantities. The reconfiguring of OTT connection 1850 may include message format, retransmission settings, preferred routing etc.; the reconfiguring need not affect base station 1820, and it may be unknown or imperceptible to base station 1820. Such procedures and functionalities may be known and practiced in the art. In certain embodiments, measurements may involve proprietary UE signaling facilitating host computer 1810's measurements of throughput, propagation times, latency and the like. The measurements may be implemented in that software 1811 and 1831 causes messages to be transmitted, in particular empty or 'dummy' messages, using OTT connection 1850 while it monitors propagation times, errors etc.

Figure 19:
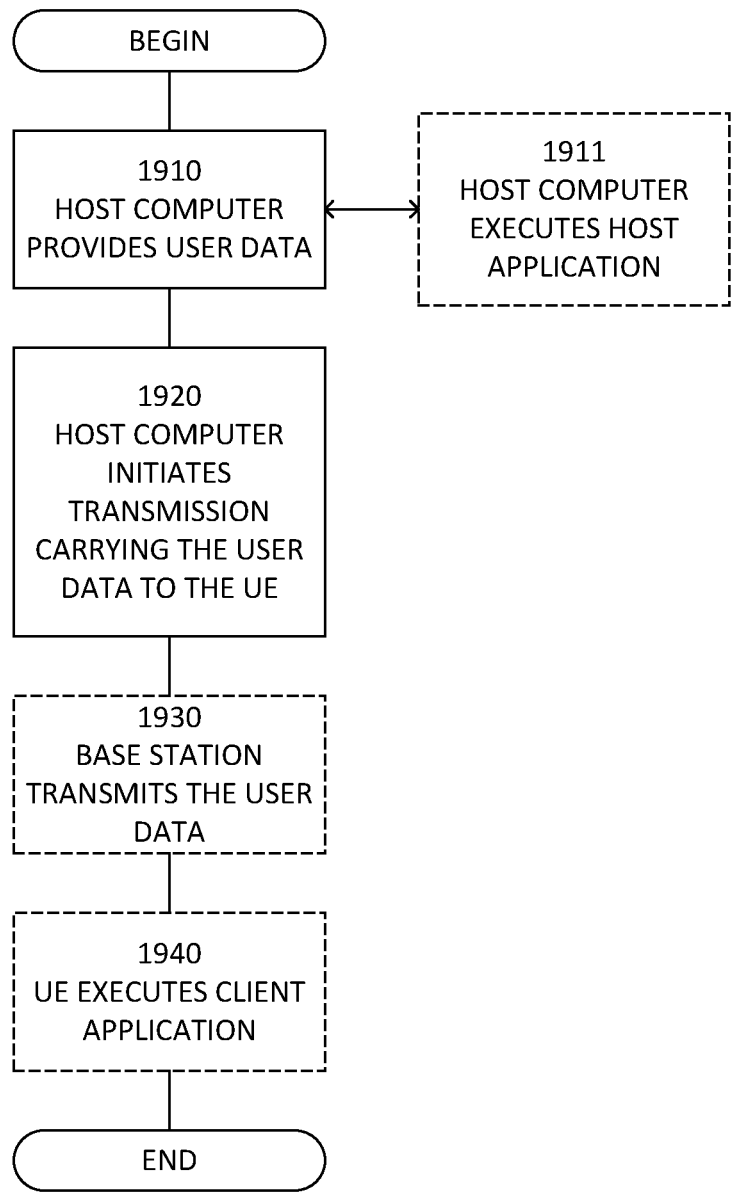
FIG. 19 is a flowchart illustrating a method implemented in a communication system, in accordance with one embodiment.

FIG. 19 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 19 will be included in this section. In step 1910, the host computer provides user data. In substep 1911 (which may be optional) of step 1910, the host computer provides the user data by executing a host application. In step 1920, the host computer initiates a transmission carrying the user data to the UE. In step 1930 (which may be optional), the base station transmits to the UE the user data which was carried in the transmission that the host computer initiated, in accordance with the teachings of the embodiments described throughout this disclosure. In step 1940 (which may also be optional), the UE executes a client application associated with the host application executed by the host computer.

Figure 20:
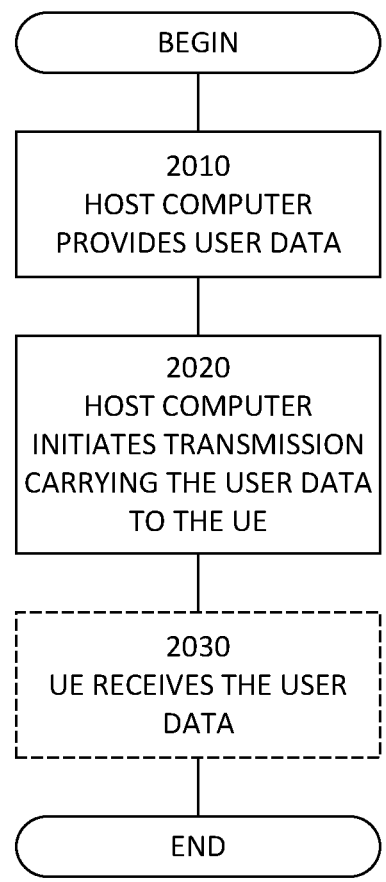
FIG. 20 is a flowchart illustrating a method implemented in a communication system, in accordance with one embodiment.

FIG. 20 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 20 will be included in this section. In step 2010 of the method, the host computer provides user data. In an optional substep (not shown) the host computer provides the user data by executing a host application. In step 2020, the host computer initiates a transmission carrying the user data to the UE. The transmission may pass via the base station, in accordance with the teachings of the embodiments described throughout this disclosure. In step 2030 (which may be optional), the UE receives the user data carried in the transmission.

Figure 21:
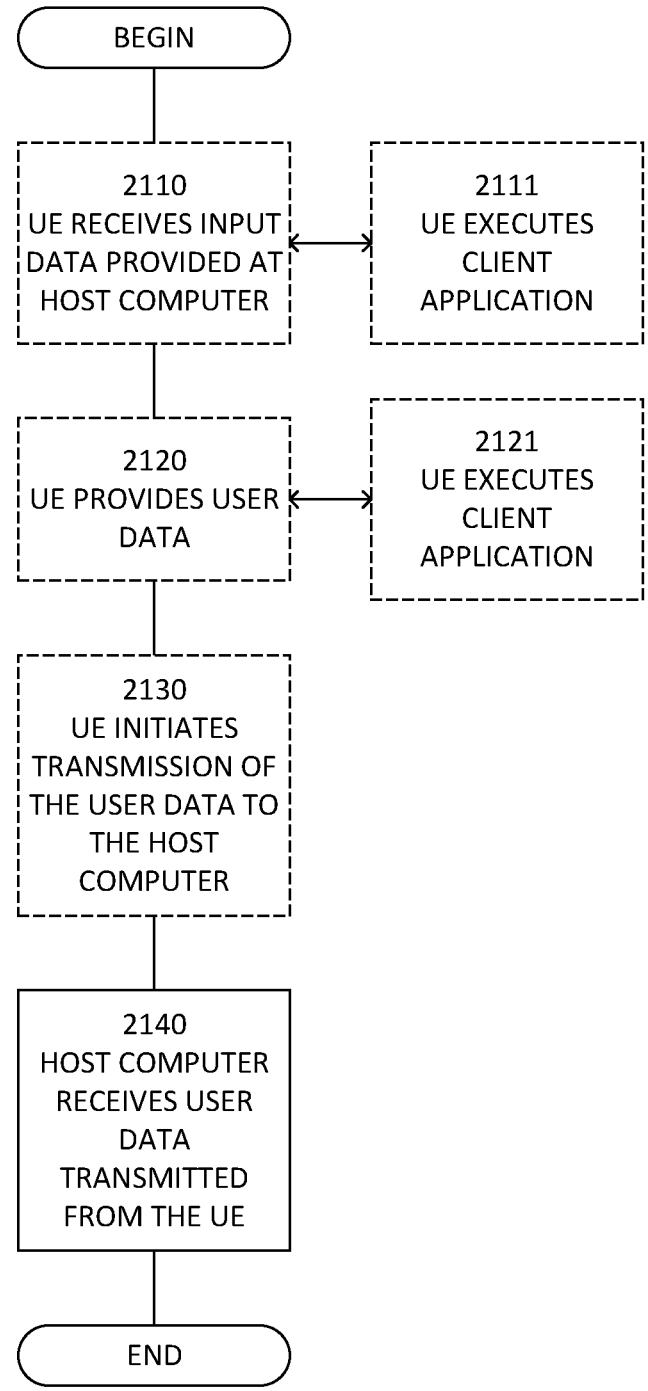
FIG. 21 is a flowchart illustrating a method implemented in a communication system, in accordance with one embodiment.

FIG. 21 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 21 will be included in this section. In step 2110 (which may be optional), the UE receives input data provided by the host computer. Additionally or alternatively, in step 2120, the UE provides user data. In substep 2121 (which may be optional)

of step 2120, the UE provides the user data by executing a client application. In substep 2111 (which may be optional) of step 2110, the UE executes a client application which provides the user data in reaction to the received input data provided by the host computer. In providing the user data, the executed client application may further consider user input received from the user. Regardless of the specific manner in which the user data was provided, the UE initiates, in substep 2130 (which may be optional), transmission of the user data to the host computer. In step 2140 of the method, the host computer receives the user data transmitted from the UE, in accordance with the teachings of the embodiments described throughout this disclosure.

Figure 22:
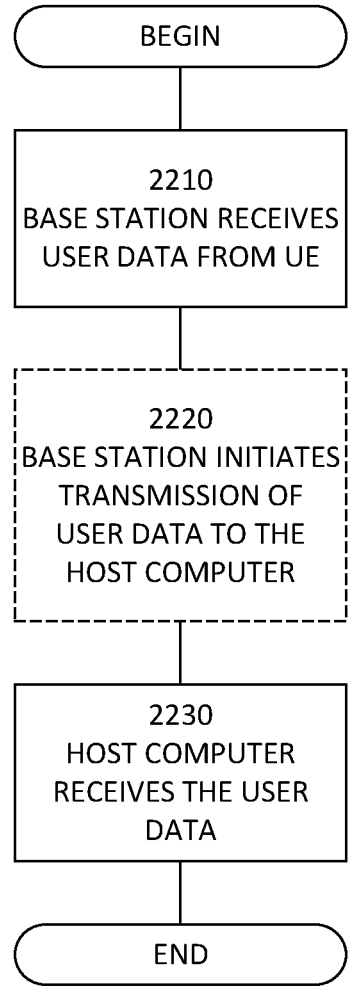
FIG. 22 is a flowchart illustrating a method implemented in a communication system, in accordance with one embodiment.

FIG. 22 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 22 will be included in this section. In step 2210 (which may be optional), in accordance with the teachings of the embodiments described throughout this disclosure, the base station receives user data from the UE. In step 2220 (which may be optional), the base station initiates transmission of the received user data to the host computer. In step 2230 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

In view of the above, then, embodiments herein generally include a communication system including a host computer. The host computer may comprise processing circuitry configured to provide user data. The host computer may also comprise a communication interface configured to forward the user data to a cellular network for transmission to a user equipment (UE). The cellular network may comprise a base station having a radio interface and processing circuitry, the base station's processing circuitry configured to perform any of the steps of any of the embodiments described above for a base station.

In some embodiments, the communication system further includes the base station.

In some embodiments, the communication system further includes the UE, wherein the UE is configured to communicate with the base station.

In some embodiments, the processing circuitry of the host computer is configured to execute a host application, thereby providing the user data. In this case, the UE comprises processing circuitry configured to execute a client application associated with the host application.

Embodiments herein also include a method implemented in a communication system including a host computer, a base station and a user equipment (UE). The method comprises, at the host computer, providing user data. The method may also comprise, at the host computer, initiating a transmission carrying the user data to the UE via a cellular network comprising the base station. The base station performs any of the steps of any of the embodiments described above for a base station.

In some embodiments, the method further comprising, at the base station, transmitting the user data.

In some embodiments, the user data is provided at the host computer by executing a host application. In this case, the method further comprises, at the UE, executing a client application associated with the host application.

Embodiments herein also include a user equipment (UE) configured to communicate with a base station. The UE comprises a radio interface and processing circuitry configured to perform any of the embodiments above described for a UE.

Embodiments herein further include a communication system including a host computer. The host computer comprises processing circuitry configured to provide user data, and a communication interface configured to forward user data to a cellular network for transmission to a user equipment (UE). The UE comprises a radio interface and processing circuitry. The UE's components are configured to perform any of the steps of any of the embodiments described above for a UE.

In some embodiments, the cellular network further includes a base station configured to communicate with the UE.

In some embodiments, the processing circuitry of the host computer is configured to execute a host application, thereby providing the user data. The UE's processing circuitry is configured to execute a client application associated with the host application.

Embodiments also include a method implemented in a communication system including a host computer, a base station and a user equipment (UE). The method comprises, at the host computer, providing user data and initiating a transmission carrying the user data to the UE via a cellular network comprising the base station. The UE performs any of the steps of any of the embodiments described above for a UE.

In some embodiments, the method further comprises, at the UE, receiving the user data from the base station.

Embodiments herein further include a communication system including a host computer. The host computer comprises a communication interface configured to receive user data originating from a transmission from a user equipment (UE) to a base station. The UE comprises a radio interface and processing circuitry. The UE's processing circuitry is configured to perform any of the steps of any of the embodiments described above for a UE.

In some embodiments the communication system further includes the UE.

In some embodiments, the communication system further including the base station. In this case, the base station comprises a radio interface configured to communicate with the UE and a communication interface configured to forward to the host computer the user data carried by a transmission from the UE to the base station.

In some embodiments, the processing circuitry of the host computer is configured to execute a host application. And the UE's processing circuitry is configured to execute a client application associated with the host application, thereby providing the user data.

In some embodiments, the processing circuitry of the host computer is configured to execute a host application, thereby providing request data. And the UE's processing circuitry is configured to execute a client application associated with the host application, thereby providing the user data in response to the request data.

Embodiments herein also include a method implemented in a communication system including a host computer, a base station and a user equipment (UE). The method comprises, at the host computer, receiving user data transmitted to the base station from the UE. The UE performs any of the steps of any of the embodiments described above for the UE.

In some embodiments, the method further comprises, at the UE, providing the user data to the base station.

In some embodiments, the method also comprises, at the UE, executing a client application, thereby providing the user data to be transmitted. The method may further comprise, at the host computer, executing a host application associated with the client application.

In some embodiments, the method further comprises, at the UE, executing a client application, and, at the UE, receiving input data to the client application. The input data is provided at the host computer by executing a host application associated with the client application. The user data to be transmitted is provided by the client application in response to the input data.

Embodiments also include a communication system including a host computer. The host computer comprises a communication interface configured to receive user data originating from a transmission from a user equipment (UE) to a base station. The base station comprises a radio interface and processing circuitry. The base station's processing circuitry is configured to perform any of the steps of any of the embodiments described above for a base station.

In some embodiments, the communication system further includes the base station.

In some embodiments, the communication system further includes the UE. The UE is configured to communicate with the base station.

In some embodiments, the processing circuitry of the host computer is configured to execute a host application. And the UE is configured to execute a client application associated with the host application, thereby providing the user data to be received by the host computer.

Embodiments moreover include a method implemented in a communication system including a host computer, a base station and a user equipment (UE). The method comprises, at the host computer, receiving, from the base station, user data originating from a transmission which the base station has received from the UE. The UE performs any of the steps of any of the embodiments described above for a UE.

In some embodiments, the method further comprises, at the base station, receiving the user data from the UE.

In some embodiments, the method further comprises, at the base station, initiating a transmission of the received user data to the host computer.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method performed by a wireless device, the method comprising:

selecting one of an occasion and resource unit to use for transmitting a payload within a slot that is the same as or immediately after a slot in which the wireless device transmits a random access preamble for random access to a wireless communication network, the one of the occasion and resource unit is selected based on one or more selection criteria, the one or more selection criteria include one or more of a type, purpose, and priority of an event that triggered the random access, the selecting comprising selecting one of an occasion and resource unit that starts one of:

less than or equal to a first threshold amount of time; and more than a second threshold amount of time after an end of the transmission of the random access preamble, depending respectively on whether the priority is a first priority level or a second priority level, the first priority level being higher than the second priority level, the first threshold amount of time being one of the same as and different than the second threshold amount of time; and transmitting the payload using the selected one of the occasion and the resource unit.

2. The method of claim 1, further comprising performing either a single clear channel assessment to assess whether unlicensed frequency spectrum is clear for the wireless device to transmit both the random access preamble and the payload, or performing two clear channel assessments, one to assess whether the unlicensed frequency spectrum is clear for the wireless device to transmit the random access preamble and another to assess whether the unlicensed frequency spectrum is clear for the wireless device to transmit the payload, depending respectively on whether or not the selected occasion or resource unit starts less than or equal to the first threshold amount of time after the end of the transmission of the random access preamble.

3. The method of claim 1, further comprising selecting one of a random access preamble and a random access channel occasion to use for the random access, and wherein selecting the one of the occasion and the resource unit to use for transmitting the payload comprises:
  determining, from among different sets of one of occasions and resources units that are respectively associated with one of different random access preambles and different random access channel occasions, the one of the set of occasions and resource units which is associated with the selected one of the random access preamble and random access channel occasion; and
  selecting the one of the occasion and the resource unit to use for transmitting the payload from among the occasions or resource units in the determined set, based on the one or more selection criteria.

4. The method of claim 3, wherein selecting the one of the occasion and the resource unit to use for transmitting the payload further comprises randomly selecting the one of the occasion and the resource unit to use from among one of multiple occasions and resource units in the determined set that meet the one or more selection criteria.

5. The method of claim 1, wherein the one or more selection criteria include the priority.

6. The method of claim 1, wherein the one or more selection criteria further include a gap in time, if any, between an end of a transmission of the random access preamble and a start of the one of the occasion and the resource unit.

7. The method of claim 1, wherein the random access is a two-step random access, wherein the random access preamble and the payload are included in a MsgA transmission, and wherein the payload is a payload of a Physical Uplink Shared Channel, PUSCH.

8. The method of claim 1, wherein the selected one of the occasion and the resource unit is one of a PUSCH occasion (PO) and a PUSCH resource unit (PRU), wherein a PUSCH resource unit is a combination of a PUSCH occasion and one of a Demodulation Reference Signal port and sequence.

9. The method of claim 1, further comprising performing one or more clear channel assessments to assess whether unlicensed frequency spectrum is clear for the wireless device to transmit the random access preamble and the payload, and wherein the transmitting comprises transmitting at least one of the random access preamble and the payload using the selected one of the occasion and the resource unit, responsive to the one or more clear channel assessments indicating that the unlicensed frequency spectrum is clear for the wireless device to transmit the random access preamble and/or the payload.

10. The method of claim 1, wherein the random access is prioritized above one or more other random accesses if one of:
  the random access is triggered for a handover of the wireless device; and
  the random access is triggered for Radio Resource Control, RRC, re-establishment in order to recover from failure of a radio link or beam.

11. The method of claim 1, wherein the random access is prioritized above one or more other random accesses if the random access is triggered by failure of the wireless device to find a valid physical uplink control channel resource for transmitting a scheduling request according to a scheduling request configuration that is mapped to a logical channel with a priority level above a priority level threshold.

12. The method of claim 1, wherein the selecting comprises selecting the one of the occasion and the resource unit from among different one of occasions and resource units configured for different channels, wherein the one of the occasion and the resource unit is selected based on at least one of channel occupancy and clear channel assessment failure statistics for the different channels.

13. The method of claim 12, wherein the selecting comprises favoring a one of the occasion and the resource unit configured for a first channel that has one of a lower channel occupancy occurrence of clear channel assessment failures than a second channel for which another one of the occasion and resource unit is configured.

14. The method of claim 12, wherein the different channels are or are associated with one of different subbands, bandwidth parts, and cells.

15. The method of claim 1, further comprising receiving configuration signaling that configures one or more parameters at the wireless device for selecting the one of the occasion and the resource unit based on the one or more selection criteria.

16. A method performed by a network node, the method comprising:
  transmitting configuration signaling to a wireless device, the configuration signaling configuring one or more parameters at the wireless device for selecting one of an occasion and resource unit based on one or more selection criteria, the one of the occasion and the resource unit being one of an occasion and resource unit to use for transmitting a payload within a slot that is one of the same as and immediately after a slot in which the wireless device transmits a random access preamble for random access to a wireless communication network, the one or more selection criteria include one or more of a type, purpose, and priority of an event that triggered the random access, the selecting comprising selecting one of an occasion and resource unit that starts one of:
  less than or equal to a first threshold amount of time; and
  more than a second threshold amount of time after an end of the transmission of the random access preamble, depending respectively on whether the priority is a first priority level or a second priority level, the first priority level being higher than the second priority level, the first threshold amount of time being one of the same as and different than the second threshold amount of time.

17. A wireless device comprising:
communication circuitry; and
processing circuitry configured to:
  select one of an occasion and resource unit to use for transmitting a payload within a slot that is the same as or immediately after a slot in which the wireless device transmits a random access preamble for random access to a wireless communication network, the one of the occasion and resource unit is selected based on one or more selection criteria, the one or more selection criteria include one or more of a type, purpose, and priority of an event that triggered the random access, the selecting comprising selecting one of an occasion and resource unit that starts one of:
    less than or equal to a first threshold amount of time; and
    more than a second threshold amount of time after an end of the transmission of the random access preamble, depending respectively on whether the priority is a first priority level or a second priority level, the first priority level being higher than the second priority level, the first threshold amount of time being one of the same as and different than the second threshold amount of time; and transmit the payload using the selected one of the occasion resource unit.

18. A network node comprising:

communication circuitry; and processing circuitry configured to transmit configuration signaling to a wireless device, the configuration signaling configuring one or more parameters at the wireless device for selecting one of an occasion and resource unit based on one or more selection criteria, the one of the occasion and the resource unit being one of an occasion and resource unit to use for transmitting a payload within a slot that is one of the same as and immediately after a slot in which the wireless device transmits a random access preamble for random access to a wireless communication network, the one or more selection criteria include one or more of a type, purpose, and priority of an event that triggered the random access, the selecting comprising selecting one of an occasion and resource unit that starts one of:

less than or equal to a first threshold amount of time; and
more than a second threshold amount of time after an end of the transmission of the random access preamble, depending respectively on whether the priority is a first priority level or a second priority level, the first priority level being higher than the second priority level, the first threshold amount of time being one of the same as and different than the second threshold amount of time.

* * * * *